(12) United States Patent
Yoshida

(10) Patent No.: US 10,887,551 B2
(45) Date of Patent: Jan. 5, 2021

(54) INFORMATION PROCESSING APPARATUS, INFORMATION PROCESSING SYSTEM AND INFORMATION PROCESSING METHOD

(71) Applicant: Eiichiro Yoshida, Kanagawa (JP)

(72) Inventor: Eiichiro Yoshida, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/695,526

(22) Filed: Nov. 26, 2019

(65) Prior Publication Data
US 2020/0177838 A1    Jun. 4, 2020

(30) Foreign Application Priority Data

Nov. 29, 2018  (JP) .................................. 2018-223800
Oct. 2, 2019   (JP) .................................. 2019-182070

(51) Int. Cl.
| | | |
|---|---|---|
| *H04N 7/15* | (2006.01) | |
| *G06F 16/9536* | (2019.01) | |
| *G06F 16/176* | (2019.01) | |
| *G06F 16/951* | (2019.01) | |

(52) U.S. Cl.
CPC .......... *H04N 7/155* (2013.01); *G06F 16/176* (2019.01); *G06F 16/951* (2019.01); *G06F 16/9536* (2019.01); *H04N 7/152* (2013.01)

(58) Field of Classification Search
USPC ............................... 348/14.01, 14.09, 14.02
See application file for complete search history.

(56) References Cited

U.S. PATENT DOCUMENTS

| | | | |
|---|---|---|---|
| 9,253,517 B2 | 2/2016 | Yoshida et al. | |
| 9,401,809 B2 | 7/2016 | Yoshida | |
| 9,436,593 B2 | 9/2016 | Yoshida | |
| 9,569,621 B2 | 2/2017 | Yoshida | |
| 10,431,187 B2 | 10/2019 | Miki | |
| 2008/0229327 A1 | 9/2008 | Yoshida | |
| 2009/0100061 A1 | 4/2009 | Yoshida | |
| 2009/0228487 A1 | 9/2009 | Yoshida | |
| 2010/0058410 A1* | 3/2010 | Rance ................ | H04N 21/4788 725/109 |
| 2011/0055329 A1* | 3/2011 | Abt, Jr. ................ | G06F 16/958 709/205 |
| 2013/0254409 A1* | 9/2013 | Maeda ................ | H04L 65/1069 709/227 |
| 2016/0134919 A1 | 5/2016 | Yoshida et al. | |
| 2018/0032997 A1* | 2/2018 | Gordon .............. | G06Q 30/0269 |
| 2019/0235715 A1 | 8/2019 | Yoshida | |

FOREIGN PATENT DOCUMENTS

JP    2017-017668    1/2017

* cited by examiner

*Primary Examiner* — Maria El-Zoobi
(74) *Attorney, Agent, or Firm* — Xsensus LLP

(57) ABSTRACT

Disclosed is an information processing apparatus for displaying editable conference content on a webpage via a web browser of a communication terminal. The information processing apparatus includes a memory, and one or more processors coupled to the memory. The one or more processors are configured to store, in a storage, conference information indicating a specific conference in association with editable conference content, and generate webpage data for displaying the conference information and the editable conference content on a webpage via the web browser of the communication terminal.

11 Claims, 25 Drawing Sheets

FIG.5A

PERSONAL MEMO ID

| CONTENT ID | CONTENT DATA | DISPLAY POSITION |
|---|---|---|
| c101 | TYPE: TEXT "T"<br>FONT TYPE: aaa<br>SIZE: 20 | (960,270) |
| c102 | TYPE: IMAGE<br>FILE NAME: XXX.jpeg | (200,10) |
| c103 | TYPE: VECTOR<br>NUMERIC DATA: ... | (1000,500) |
| . | : | : |

FIG.5B

SHARED MEMO ID

| CONTENT ID | CONTENT DATA | DISPLAY POSITION |
|---|---|---|
| c201 | TYPE: TEXT "R"<br>FONT TYPE: aaa<br>SIZE: 20 | (400,270) |
| c202 | TYPE: IMAGE<br>FILE NAME: XXX.jpeg | (400,20) |
| c203 | TYPE: VECTOR<br>NUMERIC DATA: ... | (120,600) |
| ... | ... | ... |

FIG.6A

| USER ID | PERSONAL MEMO ID |
|---|---|
| User-a | board1 |
| User-a | board2 |
| User-b | board33 |
| ... | ... |

FIG.6B

| PERSONAL MEMO ID | SHARED MEMO ID | MEMO DATA |
|---|---|---|
| board1 | c-boardA | IMPORTANT, PERSONAL MEMO, .... |
| board1 | c-boardA | CHECK REQUIRED |
| ... | ... | ... |

FIG.6C

| SHARED MEMO ID | CONFERENCE BIBLIOGRAPHIC INFORMATION | |
|---|---|---|
| c-boardA | DATE AND TIME: SEP-04-2018<br>CONFERENCE NAME: MEETING<br>LOCATION: CONFERENCE ROOM A<br>SELF-ASSESSMENT: ★★★<br>... | ... |
| ... | | |

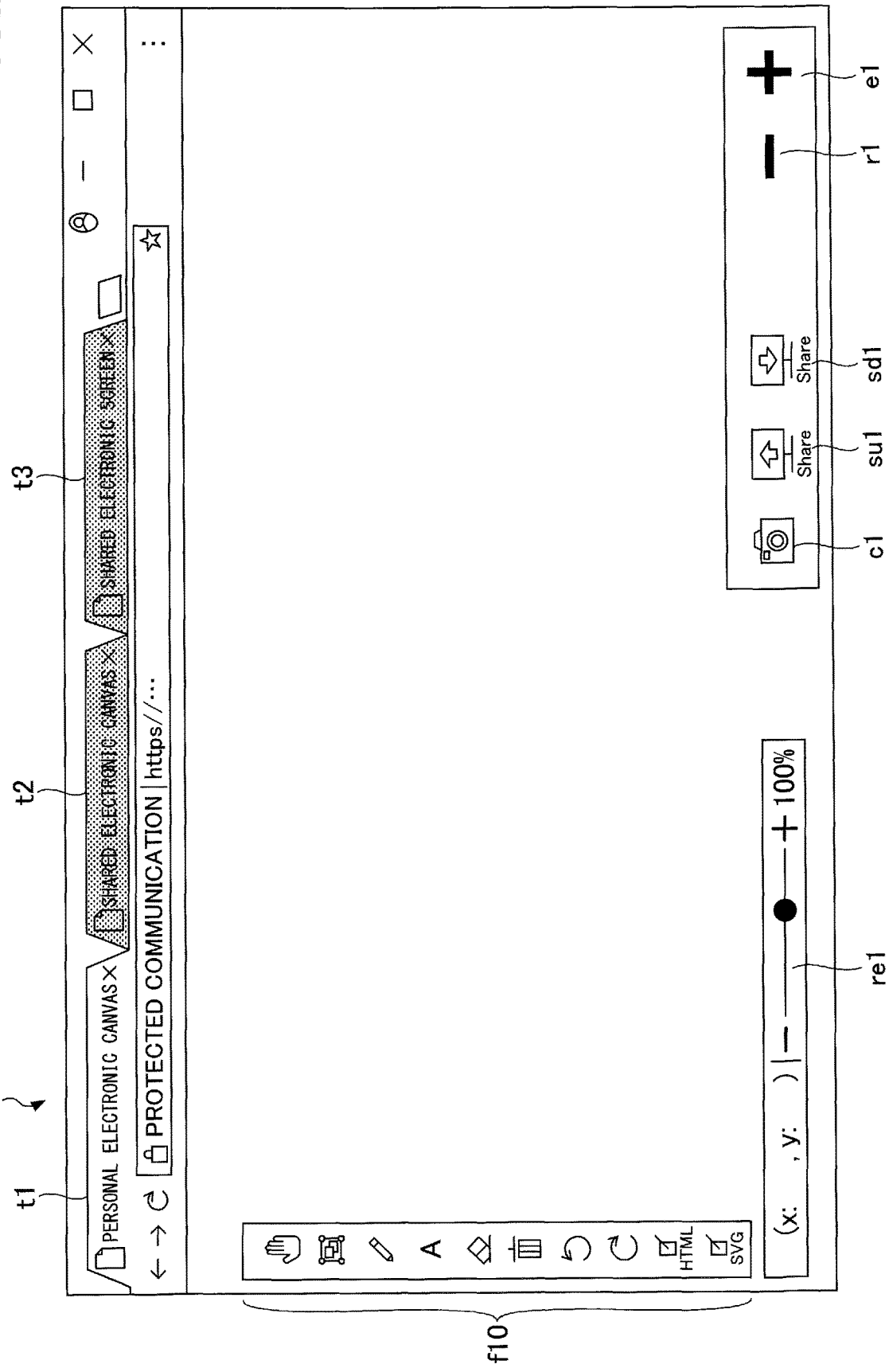

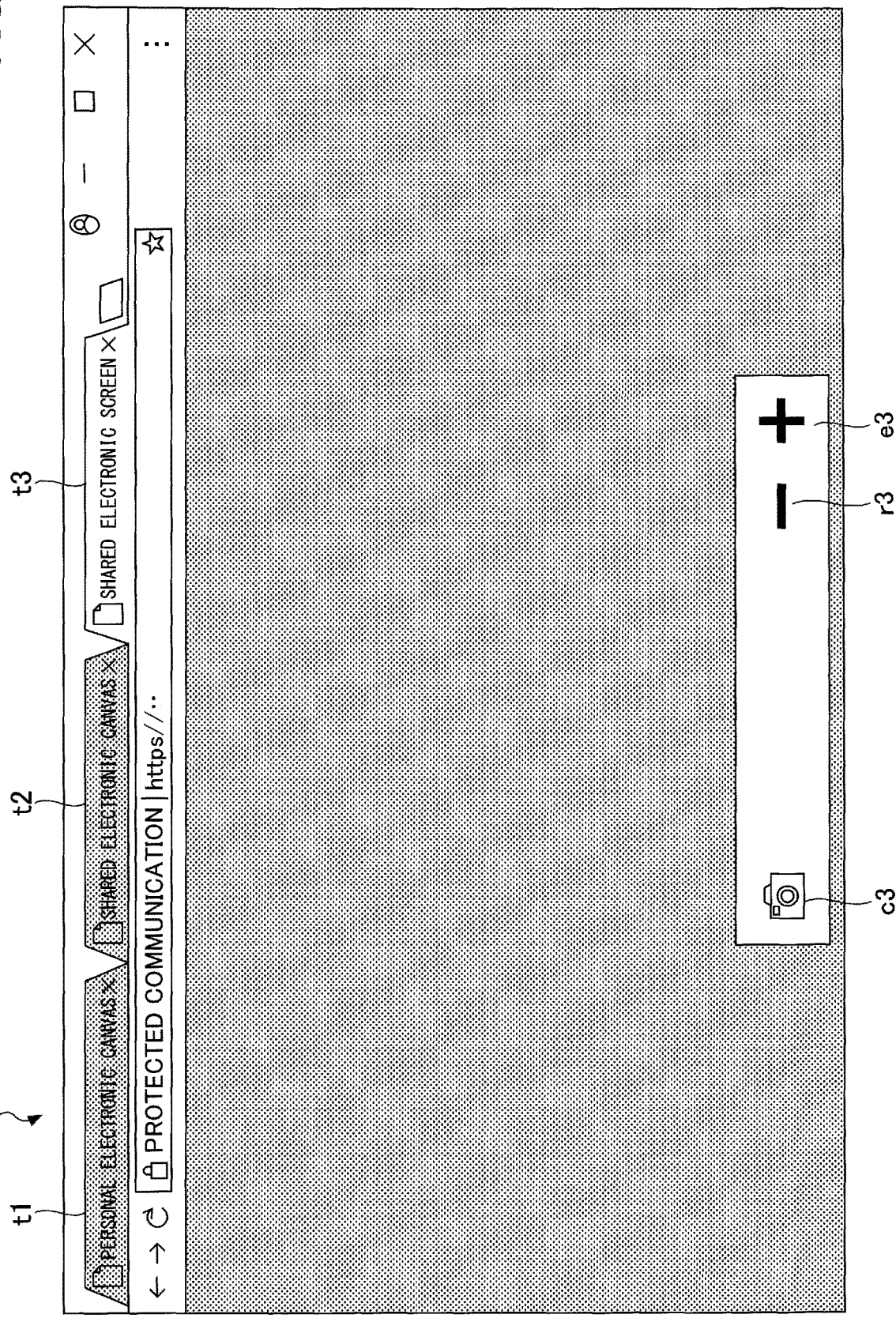

FIG.10

PERSONAL PORTAL

PERSONAL HISTORY  SETTINGS

🔍 [CHARACTER SEARCH] — 5020

| DATE AND TIME | CONFERENCE NAME | LOCATION | PERSONAL MEMO | SHARED MEMO | SELF-EVALUATION | BIBLIOGRAPHIC INFORMATION |
|---|---|---|---|---|---|---|
| OCT-05-2018 20:30 | TEST | | | | ☆☆☆☆☆ | 📄 |
| OCT-05-2018 20:30 | [PERSONAL] | | 📄 | 📄 | ☆☆☆☆☆ | 📄 |
| OCT-05-2018 10:00 | DAILY MTG | ROOM 4 | 📄 | 📄 | ★★★★☆ | 📄 |
| SEP-05-2018 04:00 | CONSULTATION | ROOM 2 | 📄 | 📄 | ★★★☆☆ | 📄 |
| SEP-04-2018 09:53 | MEETING | CONFERENCE ROOM A | 📄 | 📄 | ★★☆☆☆ | 📄 |
| SEP-04-2018 07:40 | PREPARATORY MEETING | ROOM 3 | 📄 | 📄 | ★★★☆☆ | |
| AUG-28-2018 13:00 | TRAINING SYSTEM CONSULTATION | ROOM 1 | ⋯ | ⋯ | | |

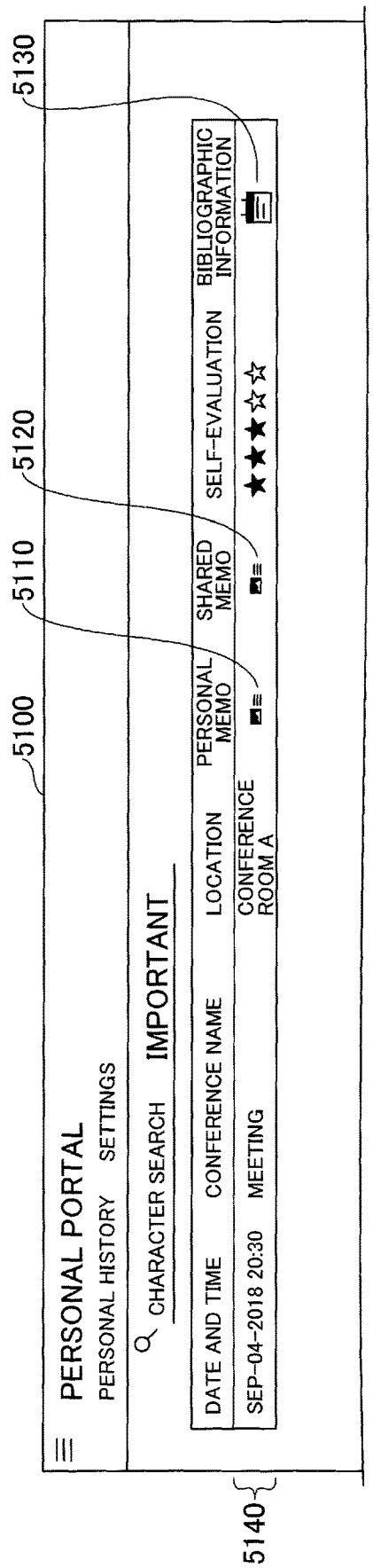

FIG.21

| SHARED MEMO ID | MEMO DATA | BIBLIOGRAPHIC INFORMATION OF CONFERENCE |
|---|---|---|
| c-boardA | IMPORTANT, IMPLEMENTATION TEST, GOOD, ... | DATE AND TIME: SEP-04-2018<br>CONFERENCE NAME: MEETING<br>LOCATION: CONFERENCE ROOM A<br>SELF EVALUATION: ★★ |
| ... | ... | ... |

INFORMATION PROCESSING APPARATUS, INFORMATION PROCESSING SYSTEM AND INFORMATION PROCESSING METHOD

CROSS-REFERENCE TO RELATED APPLICATIONS

The present application is based on and claims priority to Japanese Patent Application No. 2018-223800, filed on Nov. 29, 2018, and Japanese Patent Application No. 2019-182070, filed on Oct. 2, 2019, the contents of which are incorporated herein by reference in their entirety.

BACKGROUND OF THE INVENTION

1. Field of the Invention

The disclosure discussed herein relates to an information processing apparatus, an information processing system, and an information processing method.

2. Description of the Related Art

In the related art conferencing systems, there are conference client apparatuses that are switchable to two modes, namely, a shared mode and a personal mode. In the shared mode, for example, conference client apparatuses synchronize displayed pages of a conference material, presenter's writings (handwritten memos) on the conference material and a pointer on the conference material, along a presenter's progress of the conference (see, for example, Patent Document 1).

Such presenter's writings (handwritten memos) and individuals' handwritten memos on the conference material are typically used to review content of a conference. To facilitate reviewing of conference content after conference, some kind of a post-conference management method for managing conference materials is desirably required for reviewing conference content after conference. Such a post-conference management method may include searching for and/or checking of presenter's writings (handwritten memos) on the conference material or locally stored conference participants' individual handwritten memos on the conference material after conference. Note that Patent Document 1 does not disclose a post-conference management method such as searching for or checking of presenter's handwritten memos and locally stored individuals' handwritten memos on a conference material after conference.

PATENT DOCUMENT

Patent Document 1: Japanese Unexamined Patent Application Publication No. 2017-17668

SUMMARY OF THE INVENTION

According to an embodiment, an information processing apparatus for displaying editable conference content on a webpage via a web browser of a communication terminal is provided. The information processing apparatus includes
a memory; and
one or more processors coupled to the memory and configured to:
store, in a storage, conference information indicating a specific conference in association with editable conference content; and
generate webpage data for displaying the conference information and the editable conference content on a webpage via the web browser of the communication terminal.

Other objects, features and advantages of the present invention will become more apparent from the following detailed description when read in conjunction with the accompanying drawings.

BRIEF DESCRIPTION OF THE DRAWINGS

FIGS. 5A and 5B are schematic diagrams illustrating examples of a personal memo DB and a shared memo DB, according to the present embodiment;

FIGS. 6A to 6C are configuration diagrams illustrating examples of a user DB, a personal memo management DB, and a shared memo management DB, according to the present embodiment;

FIG. 7 is a diagram illustrating an example of an operation display area for a personal electronic canvas, according to the present embodiment;

FIG. 9 is a diagram illustrating an example of an operation display area for a shared electronic screen, according to the present embodiment;

FIG. 10 is a diagram illustrating a display example of a personal portal screen, according to the present embodiment;

FIG. 11 is a diagram illustrating an example of a personal portal screen that displays a search result, according to the present embodiment;

FIG. 21 is a configuration diagram illustrating an example of a shared memo management DB, according to the present embodiment.

DETAILED DESCRIPTION OF THE PREFERRED EMBODIMENTS

An embodiment of the present invention is intended to provide an information processing apparatus enabled to manage conference content, which is editable via a web browser of a communication terminal.

Hereinafter, embodiments of the present invention will be described in detail, with reference to the accompanying drawings. An example illustrated below according to a present embodiment is an information sharing system for use in a conference, in which a shared memo and a personal memo are used. However, the present invention is not limited thereto, and the present invention may be applicable to a variety of information processing systems. Note that in the following, wherever appropriate, the term "in-conference" is used to indicate "during conference", the term "pre-conference" is used to indicate before conference, and the term "post-conference" is used to indicate after conference.

First Embodiment

<Overview of in-Conference Information Sharing System>

Figure 1:
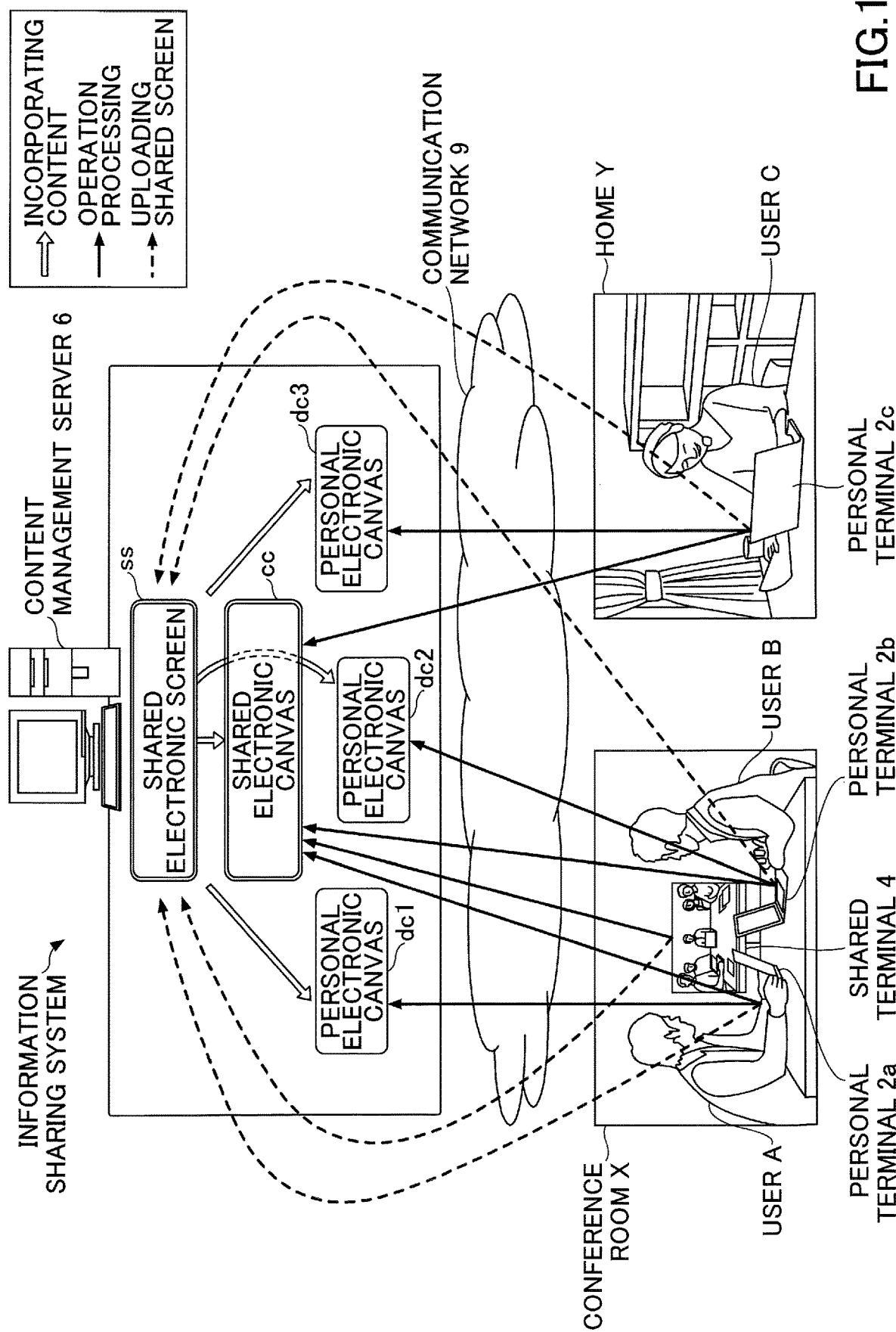
FIG. 1 is a diagram schematically illustrating an overall information sharing system during a conference (an in-conference information sharing system), according to the present embodiment.

First, an overview of an in-conference information sharing system will be described with reference to FIG. 1. FIG. 1 is a diagram schematically illustrating an in-conference information sharing system as a whole. In FIG. 1, users A and B in a company's conference room X and a user C at home Y hold a remote conference, using an information sharing system. In the conference room X, the user A brings in a personal terminal 2a, and the user B brings in a personal terminal 2b. In addition, the conference room X is provided with a shared terminal 4 that may be shared by a plurality of users. At home Y, the user C brings in a personal terminal 2c. Hereinafter, the term "personal terminal 2" is used to denote a generic term for personal terminals 2a, 2b, and 2c.

The personal terminals 2 are each a computer that allows a user to individually use and view a screen (for exclusive use). The shared terminal 4 is a computer that allows a plurality of users to jointly use and view a screen.

The personal terminals 2 and the shared terminal 4 are not limited to a personal computer (PC), a desktop PC, a cellular phone, a smartphone, a tablet terminal, or a wearable PC, for example. The personal terminals 2 and the shared terminal 4 may be an image forming apparatus, a PJ (projector), an IWB (Interactive Whiteboard: whiteboard having an electronic whiteboard function enabling mutual communication), an output device such as a digital signage, an HUD (head up display) device, an industrial machine, an imaging device, a sound collecting device, a medical device, a network appliance, a gaming device, a PDA (personal digital assistant), a digital camera, or the like. The personal terminals 2 and the shared terminal 4 are examples of communication terminals (or information processing terminals).

The personal terminals 2 and the shared terminal 4 are enabled to communicate with a content management server 6 via a communication network 9 such as the Internet. The communication network 9 may be one or more LANs (Local Area Network) inside the firewall, or the communication network 9 may include the Internet outside the firewall in addition to the LANs. The communication network 9 may also include VPN (Virtual Private Network) and Wide Area Ethernet (registered trademark). The communication network 9 may be either wired or wireless communication or the communication network 9 may be a combination of wired and wireless communications. Further, the communication network 9 may have no LANs when the personal terminals 2 and the shared terminal 4 are connected by a mobile phone network, such as 3G, LTE (Long Term Evolution), or 4G.

The content management server 6 is a computer that functions as a web (Web) server (or HTTP server). The web server stores and manages content data to be transmitted to the personal terminals 2 and to the shared terminal 4. The content management server 6 includes a later-described storage 6000, which has a storage location (or storage area) for implementing a personal electronic canvas that is only accessible from a corresponding one of personal terminals 2. Specifically, the personal electronic canvases dc1, dc2, and dc3 are only accessible from the respective personal terminals 2a, 2b, and 2c. Hereinafter, the term "personal electronic canvas dc" is used to denote a generic term for the personal electronic canvases dc1, dc2 and dc3. The content management server 6 may support cloud computing. Cloud computing is a form of access to resources provided over a network without being aware of specific hardware resources.

The storage 6000 of the content management server 6 has a storage location (or storage area) for providing a shared electronic canvas cc that is accessible from each of the personal terminals 2. In addition, the storage 6000 of the content management server 6 has a storage location (or storage area) for implementing a shared electronic screen ss that is accessible from each of the personal terminals 2.

The "electronic canvas" is a virtual space generated in a storage location (or storage area) of the storage 6000 of the content management server 6. The electronic canvas may be accessed through an electronic canvas web application, which has a function to browse and edit content by means of a canvas element and JavaScript (registered trademark), for example. A web application operates by coordinating programs in a scripting language (e.g., JavaScript [registered trademark]) running on a web browser application (hereinafter referred to as a "web browser") and programs running on a web server. The web application indicates software used on a web browser or its mechanisms. The personal electronic canvas dc and the shared electronic canvas cc have undefined space within a storage area of the storage 6000.

The "electronic screen" is not a white screen for displaying and viewing movies or slide images, but is a virtual space generated in a storage location (or storage area) of the storage 6000 of the content management server 6. Unlike the electronic canvas, the electronic screen is provided with a function to simply retain content data to be transmitted (distributed) to the personal terminals 2 or to the shared terminal 4, so as to retain previous content until the next content is acquired. The electronic screen may be accessed by an electronic screen web application that has a function to view content.

Furthermore, the personal electronic canvas dc is an electronic space dedicated to each individual of users who have participated in a remote conference. Each of the personal terminals 2 is only allowed to access a corresponding personal electronic canvas dc to view and edit (input, delete, copy, etc.) content such as characters, images, and the like. The shared electronic canvas cc is a shared electronic space for those users who have participated in a remote conference. Any one of the personal terminals 2 is accessible to the shared electronic canvas cc to view and edit content such as characters, images, and the like.

The shared electronic canvas cc is a shared electronic space for those users who have participated in a remote conference. Any one of the personal terminals 2 is accessible to the shared electronic screen ss to view a shared screen retained on the shared electronic screen ss. However, unlike the personal electronic canvas dc1 and the shared electronic canvas cc, the shared electronic screen ss has a function to simply retain content data transmitted (distributed) to the personal terminals 2 or the shared terminal 4 so as to retain previous content until next content is acquired.

For example, when content data is transmitted from the personal terminal 2a to the shared electronic screen ss, and subsequently content data is transmitted from the personal terminal 2b to the shared electronic screen ss, the content data retained by the shared electronic screen ss will be the recently received data from the personal terminal 2b.

The content management server 6 manages information, such as content loaded in the shared electronic screen ss, the shared electronic canvas cc, and the personal electronic canvas dc in association with each other, on a per virtual room basis. Accordingly, even though multiple different virtual rooms are managed by the content management server 6, content data will not be communicated between different virtual rooms.

The personal terminals 2 may each display content of the personal electronic canvas dc, the shared electronic canvas cc, and the shared electronic screen ss, through the installed web browser application, in a virtual room, in which the users of the personal terminals 2 have participated.

A virtual room is generated on a per conference basis. Users who have participated in the generated virtual room each have access to the shared electronic screen ss, the shared electronic canvas cc, and the personal electronic canvas dc. This enables the users to hold a conference in the virtual room in a manner similar to a conference in a real conference room. Such an information sharing system allows the users to share content of personal materials in a virtual room or to incorporate content of materials shared in the virtual room as personal materials.

<Overview of Personal Portals in Information Sharing Systems>

Figure 2:
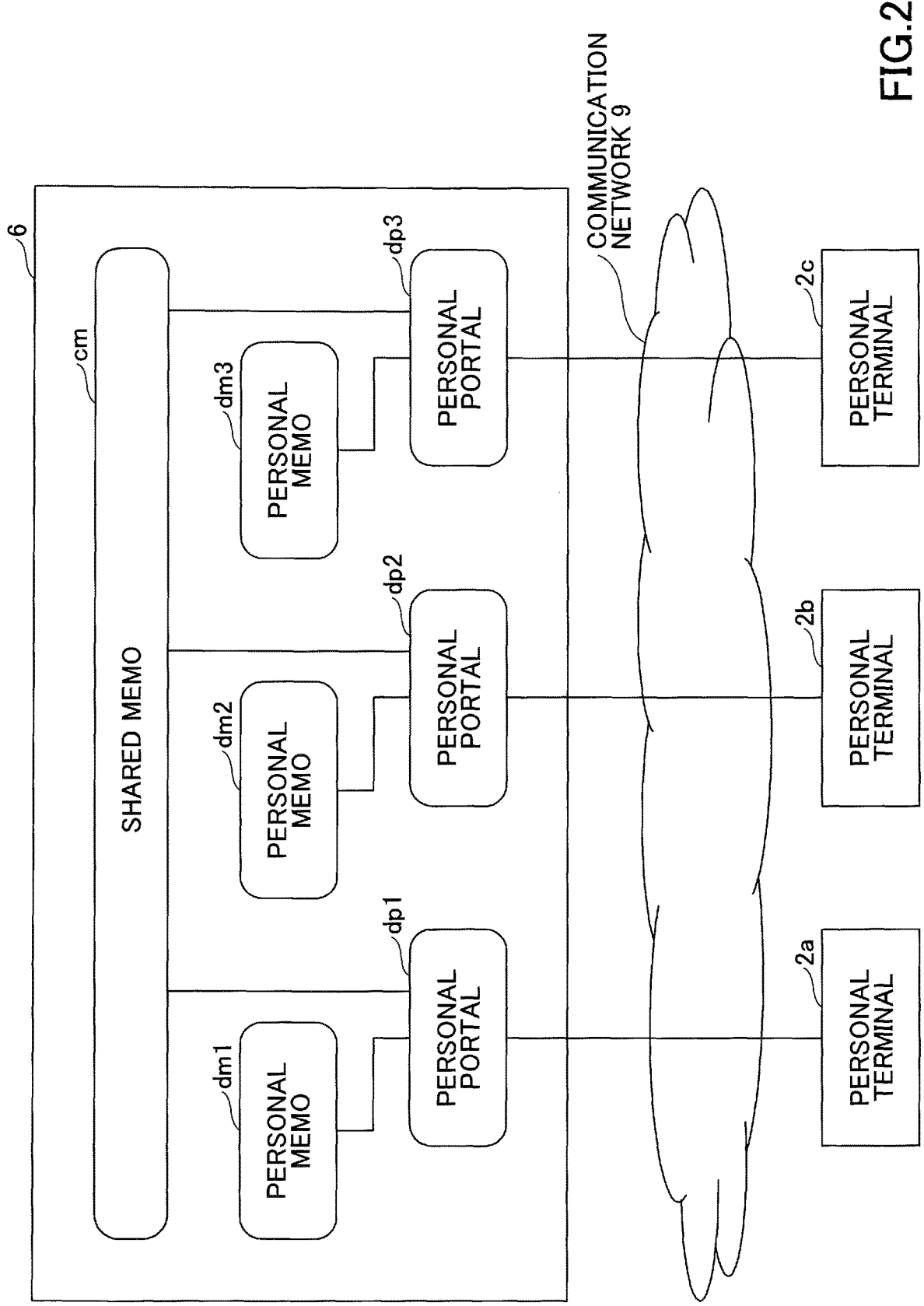
FIG. 2 is a diagram schematically illustrating personal portals in the information sharing system, according to the present embodiment.

Next, an overview of personal portals will be described with reference to FIG. 2. FIG. 2 is a diagram illustrating an overview of personal portals in an information sharing system, according to the present embodiment. The content management server 6 generates data for personal portal screens dp1, dp2, and dp3 dedicated to respective personal terminals 2, and displays the generated data on the respective personal terminals 2. Hereinafter, the term "personal portal screen dp" is used to denote a generic term for the personal portal screens dp1, dp2, and dp3.

The content management server 6 stores and manages a shared memo cm, and the personal memos dm1, dm2, and dm3. The shared memo cm is content edited on the shared electronic canvas cc of FIG. 1 during a conference, and the personal memos dm1, dm2, and dm3 are content edited on the respective personal electronic canvases dc. Hereinafter, the term "personal memo dm" is used to denote a generic term for personal memos dm1, dm2 and dm3. Users who operate the personal terminals 2 may each display a list of conferences in which he or she participated by accessing the personal portal screen dp dedicated to his/her personal terminal 2.

The users may each display a shared memo cm, a personal memo dm, and bibliographic information for a desired conference selected from a list of conferences displayed on the personal portal screen dp, as will be described below. Accordingly, the users may easily display the shared memo cm, the personal memo dm, and the bibliographic information of a desired one of the conferences so as to review content of the desired conference. In addition, the users are each able to search for and find a desired conference by keyword (characters) from the list of conferences, in which the corresponding user who operates the personal terminal 2 participated, as will be described below.

Examples of search characters that are a search target to be identified may include text data and handwritten characters included in bibliographic information of a conference or in a personal memo dm, or a user's self-evaluation of a conference. Note that bibliographic information of a conference is included in conference information. The conference information is information that indicates a specific conference or information that is associated with a specific conference. The conference information includes bibliographic information of a conference, respective IDs of a personal memo and a shared memo, and an ID of a virtual room. The conference information may further include other information, such as information generated upon accessing of a connection address, information generated upon generating of a virtual room, and actual conference starting date and time. Bibliographic information of a conference includes a conference name, location, date and time, participant names, participant IDs, and the like.

<Hardware Configuration>

Figure 3:
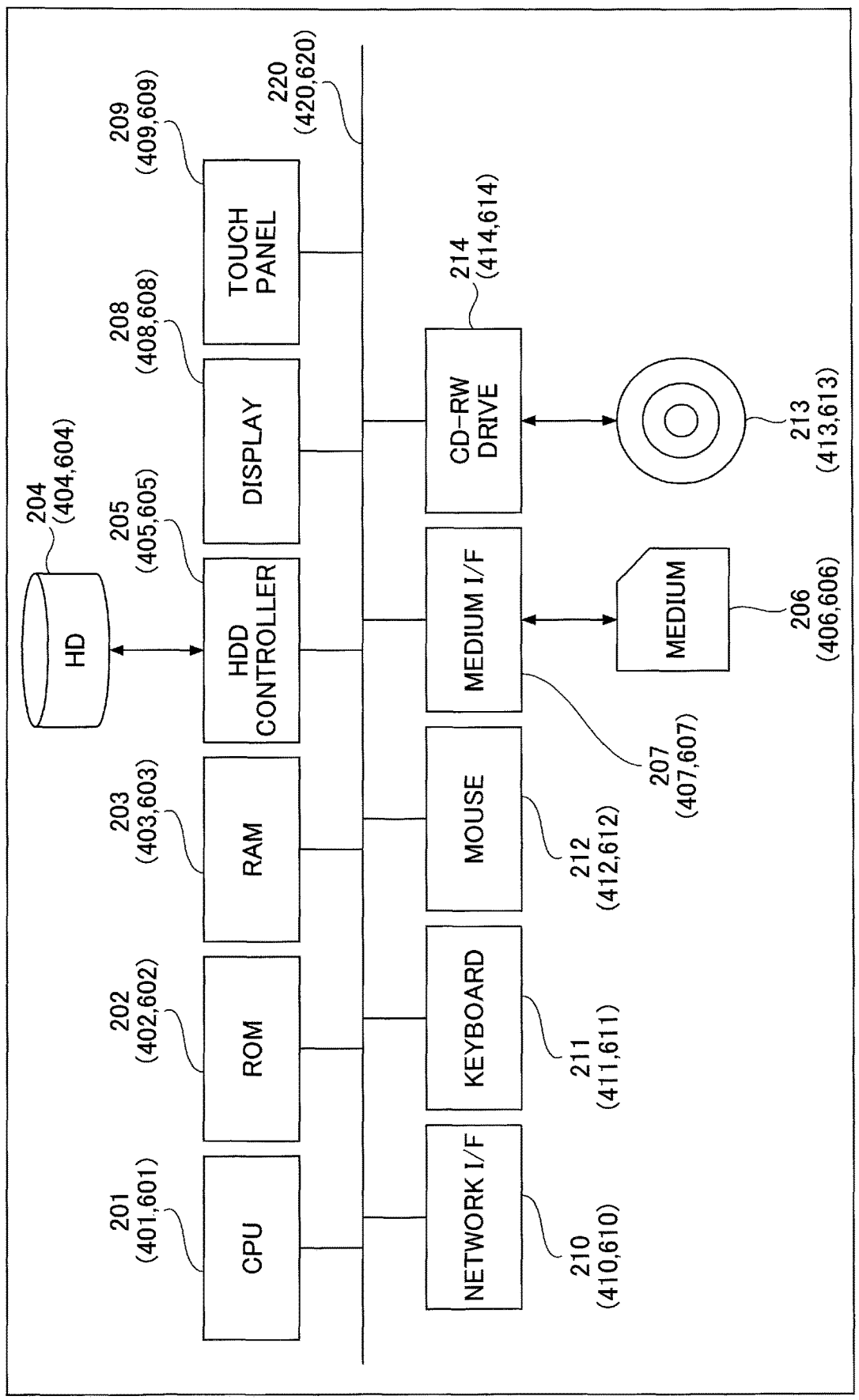
FIG. 3 is a diagram illustrating a hardware configuration of a terminal and a server that constitute the information sharing system, according to the present embodiment.

A hardware configuration of a terminal and a server that constitute an information sharing system will be described with reference to FIG. 3. FIG. 3 is a diagram illustrating a hardware configuration of a terminal and a server that constitute an information sharing system according to the present embodiment.

<<Hardware Configurations of Personal Terminal and Shared Terminal>>

As illustrated in FIG. 3, the personal terminal 2 includes a CPU (Central Processing Unit) 201, a ROM (Read Only Memory) 202, a RAM (Random Access Memory) 203, an HD (Hard Disk) 204, an HDD (Hard Disk Drive) controller 205, a recording medium 206, a medium I/F 207, a display 208, a touch panel 209, a network I/F 210, a keyboard 211, a mouse 212, a CD-RW (Compact Disc-ReWritable) drive 214, and a bus line 220.

Of these, the CPU 201 controls an overall operation of a personal terminal 2. The ROM 202 stores a program used to drive the CPU 201. The RAM 203 is used as a work area of CPU 201. The HD 204 stores various data such as a program. The HDD controller 205 controls reading or writing of various data with respect to the HD 204 following the control of the CPU 201. The medium I/F 207 controls reading or writing (storing) of data to a recording medium 206, such as a flash memory.

The display 208 displays various types of information, such as a cursor, menus, windows, characters, or images. The touch panel 209 is a type of input unit that operates a personal terminal 2 when a user touches the display 208. The network I/F 210 is an interface that performs data communication using the communication network 9. The keyboard 211 is a type of input unit that has a plurality of keys to input characters, numbers, various indications, and the like. The mouse 212 is a type of input unit that selects and executes various instructions, selects a processing target, moves a cursor, and the like. The CD-RW drive 214 controls reading or writing of various data with respect to the CD-RW 213, which is an example of a removable recording medium.

The shared terminal 4 includes a CPU 401, a ROM 402, a RAM 403, an HD 404, an HDD controller 405, a recording medium 406, a medium I/F 407, a display 408, a touch panel 409, a network I/F 410, a keyboard 411, a mouse 412, a CD-RW drive 414, and a bus line 420. These components have configurations similar to those described above (CPU 201, ROM 202, RAM 203, HD 204, HDD controller 205, recording medium 206, medium I/F 207, display 208, touch panel 209, network I/F 210, keyboard 211, mouse 212, CD-RW drive 214, and bus line 220). Thus, descriptions of these components are omitted.

<<Hardware Configurations of Content Management Server and Schedule Management Server>>

The shared terminal 4 includes a CPU 601, a ROM 602, a RAM 603, an HD 604, an HDD controller 605, a recording medium 606, a medium I/F 607, a display 608, a touch panel 609, a network I/F 610, a keyboard 611, a mouse 612, a CD-RW drive 614, and a bus line 620. These components have configurations similar to those described above (CPU 201, ROM 202, RAM 203, HD 204, HDD controller 205, recording medium 206, medium I/F 207, display 208, touch panel 209, network I/F 210, keyboard 211, mouse 212, CD-RW drive 214, and bus line 220). Thus, descriptions of these components are omitted. Note that the content management server 6 may not necessarily include a touch panel 609.

The content management server 6 may include a DVD-R drive or the like instead of the CD-RW drive. The personal terminal 2, the shared terminal 4, the content management server 6, and a schedule management server 8 may each be constructed by a single computer; or the personal terminal 2, the shared terminal 4, the content management server 6, and the schedule management server 8 may each be constructed by a plurality of computers, which are allocated to respective units (functions, functional units, or storage).

<Functional Configurations>

Figure 4:
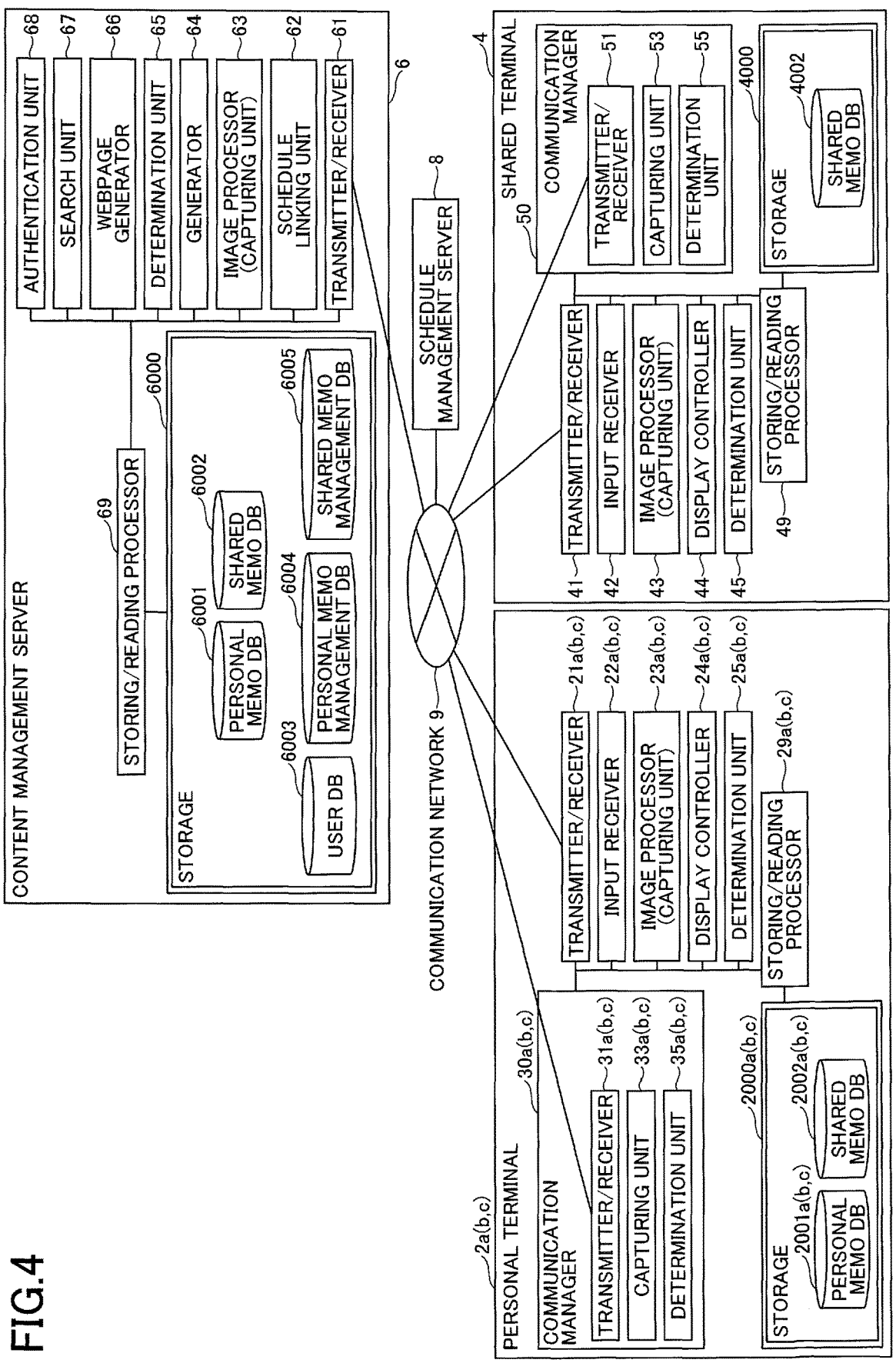
FIG. 4 is a functional block diagram illustrating respective terminals and a server that constitute the information sharing system, according to the present embodiment.

Functional configurations of terminals and a server that constitute the information sharing system will be described with reference to FIG. 4. FIG. 4 is a functional diagram illustrating hardware configurations of terminals and a server that constitute the information sharing system according to the present embodiment.

<<Functional Configuration of Personal Terminal>>

First, the functional configuration of the personal terminal 2a will be described. As illustrated in FIG. 4, the personal terminal 2a includes a transmitter/receiver 21a, an input receiver 22a, an image processor 23a, a display controller 24a, a determination unit 25a, a storing/reading processor 29a, and a communication manager 30a. The above-described components are functions or functional units implemented by causing any one of components illustrated in FIG. 3 to operate instructions from the CPU 201 in accordance with a program loaded from the HD 204 in the RAM 203. The personal terminal 2a includes a storage 2000a constructed by the RAM 203 and the HD 204 illustrated in FIG. 3.

The transmitter/receiver 21a, the input receiver 22a, the image processor 23a, the display controller 24a, the determination unit 25a, and the storing/reading processor 29a are implemented by a web browser application (a web application) for displaying a later-described operation display area. The communication manager 30a is implemented by a dedicated communication application.

(Personal Memo DB)

FIG. 5A is a configuration diagram illustrating an example of a personal memo DB. A personal memo DB 2001 as illustrated in FIG. 5A is constructed in a storage 2000a of the personal terminal 2a. The personal memo DB 2001a is generated in a cache of the web browser so that the personal memo DB 2001a only exists while the web browser is running.

The data managed by the personal memo DB 2001a is the same as the data managed per personal terminal 2 by a later-described personal memo DB 6001 in the content management server 6. For example, the personal terminal 2a acquires data for the personal terminal 2a from among the data for respective personal terminals 2 managed by the content management server 6, and manages the acquired data for the personal terminal 2a in the personal memo DB 2001a.

The personal memo DB 2001a manages a set of content ID, content data, and display position of content data in association with the personal memo ID for identifying the personal memo of the personal electronic canvas dc. Of these, the content ID is an example of content identification information for identifying each content. The content data includes text data, images such as a screen captured image, and vector data obtained by rendering. The display position of content data indicates a display position of content in the personal electronic canvas dc. Note that a screen captured image is captured by the capturing unit 33a as a captured result of the shared electronic screen ss, upon clicking of the capture button c1 in the operation display area 110 for the personal electronic canvas dc illustrated in FIG. 7. The shared electronic screen ss is displayed in the operation display area 130 for the shared electronic screen ss that is in association with the personal electronic canvas dc (i.e., the shared electronic screen ss and the personal electronic canvas dc belong to the same virtual room).

(Shared Memo DB)

FIG. 5B is a configuration diagram illustrating an example of a shared memo DB. The shared memo DB 2002a is constructed in the storage 2000a of the personal terminal 2a as illustrated in FIG. 5B. The shared memo DB 2002a is generated in a cache of the web browser so that the shared memo DB 2002a only exists while the web browser is running.

The data managed by the shared memo DB 2002a is the same as the data managed by a later described shared memo DB 6002 in the content management server 6. For example, the personal terminal 2a acquires data managed by the content management server 6, and manages the acquired data in the shared memo DB 2002a.

The shared memo DB 2002a manages a set of content ID, content data, and a display position of the content data, in association with the shared memo ID for identifying the shared memo of the shared electronic canvas cc. Of these, the content ID is an example of content identification information for identifying each content. The content data includes text data, images such as screen captured image, and vector data obtained by rendering. The display position of content data indicates a display position of content in the shared electronic canvas cc.

(Functional Configurations)

Next, a functional configuration of the personal terminals 2a will be described in detail. The transmitter/receiver 21a transmits to and receives from other terminals, devices, or servers, various data (or information) through the communication network 9. For example, the transmitter/receiver 21a receives content data described in HTML, CSS (Cascade Style Sheet), and JavaScript (registered trademark) from the content management server 6. The transmitter/receiver 21a transmits to the content management server 6 operation information input by a user.

The input receiver 22a receives various inputs from the keyboard 211 and the mouse 212 by a user. For example, the image processor 23a performs processing such as generating of vector data (or stroke data) according to rendering performed by a user. The image processor 23a has a function as a capturing unit to capture image data of a screen by capturing of the screen of, for example, a later-described operation display area 130.

The display controller 24a displays various images and screen content on the display 208. The determination unit 25a makes various determinations. The storing/reading processor 29a is executed by instructions from the CPU 201, and also by the HDD controller 205, the medium I/F 207, and the CD-RW drive 214 illustrated in FIG. 3, so as to perform processing for storing various data in the storage 2000a, the recording medium 206, and the CD-RW 213, and also to perform processing for reading various data from the storage 2000a, the recording medium 206, and the CD-RW 213.

The communication manager 30a is implemented mainly by instructions from the CPU 201 illustrated in FIG. 3, so as to input or output data with respect to the transmitter/receiver 21a or the like. The communication manager 30a further includes a transmitter/receiver 31a, a capturing unit 33a, and a determination unit 35a.

Of these, the transmitter/receiver 31a transmits to and receives from the content management server 6 various data (or information) through the communication network 9 independently of the transmitter/receiver 21a. The capturing unit 33a basically has the same function as the image processor 23a acting as a capturing unit. For example, the capturing unit 33a captures image data of a screen by capturing of the screen of the later-described operation display area 130. The determination unit 35a makes various determinations; for example, the determination unit 35a determines whether the operation display area 130 for the shared electronic screen ss is displayed on the display 208 of the personal terminal 2a. Since the functional configurations of the personal terminals 2b and 2c are the same as the functional configuration of the personal terminals 2a, descriptions of the personal terminals 2b and 2c will not be repeated.

<<Functional Configuration of Shared Terminal>>

Next, a functional configuration of the shared terminal 4 will be described. As illustrated in FIG. 4, the shared terminal 4 includes a transmitter/receiver 41, an input receiver 42, an image processor 43, a display controller 44, a determination unit 45, a storing/reading processor 49, and a communication manager 50. The above-described components are functions or functional units implemented by causing any one of components illustrated in FIG. 3 to operate instructions from the CPU 401 in accordance with a program loaded from the HD 404 in the RAM 403.

The shared terminal 4 includes a storage 4000 constructed by the RAM 403 and the HD 404 illustrated in FIG. 3. The transmitter/receiver 41, the input receiver 42, the image processor 43, the display controller 44, the determination unit 45, the storing/reading processor 49, the communication manager 50, and the storage 4000 in the shared terminal 4 are configured in a manner similar to the transmitter/receiver 21a, the input receiver 22a, the image processor 23a, the display controller 24a, the determination unit 25a, the storing/reading processor 29a, the communication manager 30a, and the storage 2000a in the personal terminal 2a. Thus, descriptions of these components will not be repeated. Further, the communication manager 50 includes a transmitter/receiver 51, a capturing unit 53, and a determination unit 55. However, since the communication manager 50 has functions similar to the transmitter/receiver 31a, the capturing unit 33a, and the determination unit 35a, a description of the communication manager 50 will not be repeated.

A shared memo DB 4002 is constructed in the storage 4000 of the shared terminal 4. Since the shared memo DB 4002 has the same data structure as the shared memo DB 2002a of the personal terminal 2a, a description of the shared memo DB 4002 will not be repeated.

The transmitter/receiver 41, the input receiver 42, the image processor 43, the display controller 44, the determination unit 45, and the storing/reading processor 49 are implemented by a web browser (a web application) that displays an operation display area as described below. The communication manager 50 is implemented by a dedicated communication application.

<<Content Management Server Configuration>>

Next, the functional configuration of the content management server 6 will be described. As illustrated in FIG. 4, the content management server 6 includes a transmitter/receiver 61, a schedule linking unit 62, an image processor 63, a generator 64, a determination unit 65, a webpage generator 66, a search unit 67, an authentication unit 68, and a storing/reading processor 69. The above-described components are functions or functional units implemented by causing any one of components illustrated in FIG. 3 to operate instructions from the CPU 601 in accordance with a program loaded from the HD 604 in the RAM 603. The content management server 6 includes a storage 6000 constructed by the RAM 603 and the HD 604 illustrated in FIG. 3.

(Functional Configuration)

Next, the functional configuration of the content management server 6 will be described in detail. The transmitter/receiver 61 transmits various data (or information) and receives various data (or information) from other terminals, devices, or servers through the communication network 9. The schedule linking unit 62 acquires schedule information including bibliographic information of a conference, in which a user participates, from the schedule management server 8 connected to the communication network 9 to transmit and receive various data (or information).

The image processor 63 functions as a capturing unit and captures screen image data by performing, for example, screen capturing with respect to a later-described shared electronic canvas cc. The generator 64 generates a unique content ID, a personal memo ID, a shared memo ID, or the like. The determination unit 65 determines whether a content ID, a personal memo ID, a shared memo ID, a user ID, or the like is received by the transmitter/receiver 61.

The webpage generator 66 generates webpage data for displaying a webpage via the respective web browsers of the personal terminal 2 and the shared terminal 4. The search unit 67 receives a search request from a later-described personal portal screen displayed by the web browsers of the personal terminal 2 and the shared terminal 4, and performs search according to the search request. The authentication unit 68 performs user's authentication (log-in) processing with respect to a web site. The authentication unit 68 may be provided in an apparatus other than the content management server 6. The authentication unit 68 may be provided, for example, in an authentication server connected to the communication network 9.

The storing/reading processor 69 is executed by instructions from the CPU 601, the HDD controller 605, the medium I/F 607, and the CD-RW drive 614 illustrated in FIG. 3. The storing/reading processor 69 performs processing for storing various data in the storage 6000, the recording medium 606, and the CD-RW 613, and also performs processing for reading various data from the storage 6000, the recording medium 606, and the CD-RW 613.

Further, the personal memo DB 6001, the shared memo DB 6002, a user DB 6003, a personal memo management DB 6004, and a shared memo management DB 6005 are constructed in the storage 6000 of the content management server 6. Since the personal memo DB 6001 and the shared memo DB 6002 have the same data structure as the personal memo DB 2001a and the shared memo DB 2002a, descriptions of the personal memo DB 6001 and the shared memo DB 6002 will not be repeated. However, the personal memo DB 6001 contains all data of the personal memo DBs 2001a, 2001b, and 2001c. In addition, the shared memo DB 6002 has all data of the shared memo DBs 2002a, 2002b, and 2002c, and the shared memo DB 4002. The user DB 6003, the personal memo management DB 6004, and the shared memo management DB 6005 are configured as illustrated in FIGS. 6A to 6C, for example.

(User DB)

FIG. 6A is a configuration diagram illustrating an example of a user DB. The storage 6000 of the content management server 6 includes a user DB 6003 as illustrated in FIG. 6A. The user DB 6003 is configured to manage the personal memo ID in association with the user ID (an example of user identification information) to identify a user. Upon a user ID of a user who operates the personal terminal 2 being identified according to the user DB 6003 of FIG. 6A, the personal memo ID of this user may be identified.

(Personal Memo Management DB)

FIG. 6B is a configuration diagram illustrating an example of a personal memo management DB. The storage 6000 of the content management server 6 includes a personal memo management DB 6004 as illustrated in FIG. 6B. The personal memo management DB 6004 is configured to manage a set of the shared memo ID and a memo data in association with the personal memo ID for identifying the personal memo. The memo data is text data included in the personal memo dm noted by a user on the personal electronic canvas dc or text data extracted from handwritten characters by optical character recognition (OCR).

Upon the personal memo ID being identified according to the personal memo management DB 6004 of FIG. 6B, the shared memo ID of the shared memo cm written by a user on the shared electronic canvas cc at a conference, and text data (memo data) indicating content of characters written by the same user on the personal electronic canvas dc at the same conference are identified.

(Shared Memo Management DB)

FIG. 6C is a configuration diagram illustrating an example of a shared memo management DB. The storage 6000 of the content management server 6 includes a shared memo management DB 6005 as illustrated in FIG. 6C. The shared memo management DB 6005 is configured to manage bibliographic information of a conference in association with the shared memo ID for identifying a shared memo. The bibliographic information of a conference is bibliographic information of a conference, at which a user writes a shared memo cm on the shared electronic canvas cc. Upon the shared memo ID being identified according to the shared memo management DB 6005 illustrated in FIG. 6C, the bibliographic information of that conference is identified.

Thus, according to the user DB 6003, the personal memo management DB 6004, and the shared memo management DB 6005 illustrated in FIGS. 6A to 6C, the bibliographic information of a conference in which a user has participated, and the personal memo dm and the shared memo cm of the conference may be identified from the user ID of the user who operates the personal terminal 2.

Note that the above-described programs may be recorded in a recording medium such as a CD-R or a DVD-R and distributed domestically or overseas.

<Display Example of Operation Display Area>

Next, examples of respective operation display areas will be described with reference to FIGS. 7 to 9. An operation display area is an area on a screen for displaying information to be presented to a user or receiving an operation from a user by GUI (Graphical User Interface). GUI is a display form of an interface such as a web browser or application software. An operation display area 110 represents any area in the personal electronic canvas dc. An operation display area 120 represents any area in the shared electronic canvas dc. An operation display area 130 represents any area in the shared electronic screen ss.

FIG. 7 is a diagram illustrating an example of an operation display area for a personal electronic canvas. As illustrated in FIG. 7, the operation display area 110 for a personal electronic canvas dc is displayed by a user's selecting tab t1 of the "personal electronic canvas" from among three tabs t1 to t3.

On the left side of the operation display area 110, displayed is a functional icon unit f10 including various functional icons such as an icon for moving a screen and an icon of a drawing pen. A slide bar re1 is displayed at the lower left of the operation display area 110 for designating a character size by stepwise reduction/enlargement. Further, a capture button c1, a shared upload button su1, a shared download button sd1, a minus button r1, and a plus button e1 are displayed at the lower right of the operation display area 110.

Of these, the capture button c1 is a button for causing the capturing unit 33a or the like to capture a screen displayed in the operation display area 130 for the shared electronic screen ss, and display the captured screen in the operation display area 110 for the personal electronic canvas dc. That is, capturing of a screen of the operation display area 130 for the shared electronic screen ss is started by clicking of the capture button c1 in the operation display area 110 for the personal electronic canvas dc. Note that the operation display area 110 for the personal electronic canvas dc incorporates image data of the captured screen of the operation display area 130 for the shared electronic screen ss. Note that the capture button c1 is represented by an icon representing the shape of a camera.

The shared upload button su1 is a button for uploading image data of an overall screen displayed on the display 208 of the personal terminal 2 to the content management server 6, and loading the uploaded image data to the shared electronic screen ss. The shared download button sd1 is a button for downloading image data loaded to the shared electronic screen ss from the content management server 6, and displaying the image data in the operation display area 110 for the personal electronic canvas dc. The minus button r1 is a button for reducing the proportion of the operation display area 110 relative to the display 208. The plus button e1 is a button for increasing the proportion of the operation display area 110 relative to the display 208.

Figure 8:
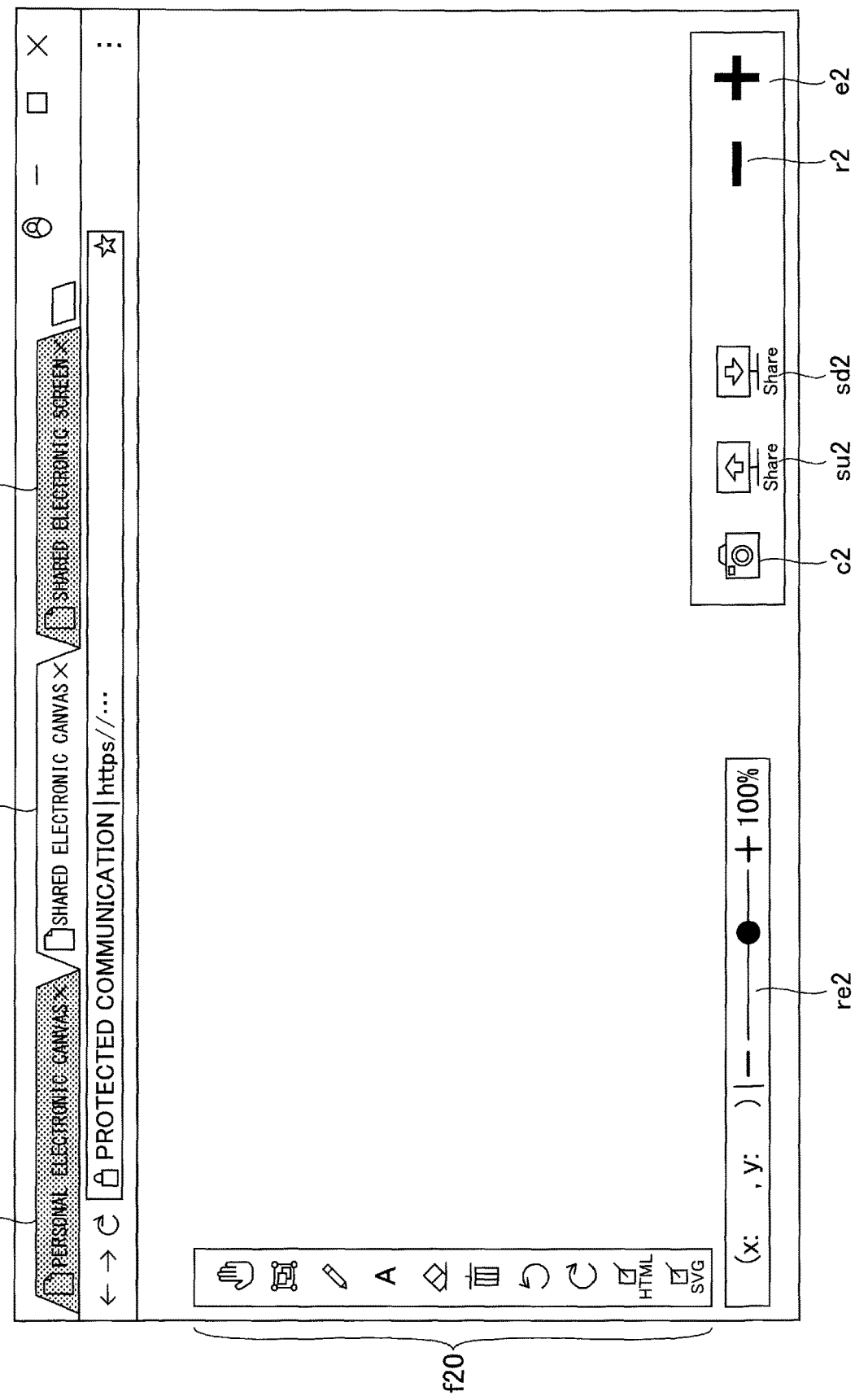
FIG. 8 is a diagram illustrating an example of an operation display area for a shared electronic canvas, according to the present embodiment.

FIG. 8 is a diagram illustrating an example of an operation display area for a shared electronic canvas. As illustrated in FIG. 8, the operation display area 120 for the shared electronic canvas cc is displayed by a user's selecting of tab t2 of the "shared electronic canvas" from among the three tabs t1 to t3.

On the left side of the operation display area 120, displayed is a functional icon unit f20. The functional icon unit f20 includes various functional icons such as an icon for moving a screen and an icon of a drawing pen. A slide bar re2 is displayed at the lower left of the operation display area 120 for designating a character size by stepwise reduction/enlargement. Further, a capture button c2, a shared upload button su2, a shared download button sd2, a minus button r2, and a plus button e2 are displayed at the lower right of the operation display area 120.

Of these, the capture button c2 is a button for causing the capturing unit 33a or the like to capture a screen displayed in the operation display area 130 for the shared electronic screen ss, incorporate a captured screen in the operation display area 120 for the shared electronic canvas cc, and display the incorporated screen. That is, capturing of a screen of the operation display area 130 for the shared electronic screen ss is started by clicking of the capture button c2 in the operation display area 120 for the shared electronic canvas cc, which is responsible for incorporating image data of the captured screen. Note that the capture button c2 is represented by an icon representing the shape of a camera.

The shared upload button su2 is a button for uploading image data of a screen displayed in the operation display area 120 for the shared electronic canvas cc to the content management server 6, and loading the uploaded image data to the shared electronic screen ss. The shared download button sd2 is a button for downloading image data loaded on the shared electronic screen ss from the content management server 6, and displaying the image data in the operation display area 120 for the shared electronic canvas cc. The minus button r2 and plus button e2 perform the same functions as the minus button r1 and plus button e1 displayed in the operation display area 110, respectively. Thus, descriptions of the minus button r2 and plus button e2 will not be repeated.

FIG. 9 is a diagram illustrating an example of an operation display area for a shared electronic screen. As illustrated in FIG. 9, the operation display area 130 for the shared electronic screen ss is displayed by a user's selecting of tab t3 of the "shared electronic screen" from among the three tabs t1 to t3.

The capture button c3, minus button r3, and plus button e3 are displayed at a lower side of the operation display area 130. The capture button c3 is a button for capturing a screen displayed in the operation display area 130 for the shared electronic screen ss and displaying the captured screen in the operation display area 120 for the shared electronic canvas cc. That is, in a case where capturing of the screen of the operation display area 130 for the shared electronic screen ss is started by clicking of the capture button c3 in the operation display area 130 for the shared electronic screen ss, the operation display area 120 for the shared electronic canvas cc incorporates the captured screen. Note that the capture button c3 is represented by an icon representing the shape of a camera.

<Example of Personal Portal Screen>

Next, an example of a personal portal screen will be described with reference to FIGS. 10 to 14. FIG. 10 is a diagram illustrating an example of a personal portal screen. A personal portal screen 5000 illustrated in FIG. 10 displays a list 5010 of conferences, in which a user who operates the personal terminal 2 participated. The list 5010 of conferences may be generated using the user DB 6003 of FIG. 6A, the personal memo management DB 6004 of FIG. 6B, and the shared memo management DB 6005 of FIG. 6C, as described below.

In the example of the list 5010 of conferences illustrated in FIG. 10, date and time, conference name, location, personal memo button 5030, shared memo button 5040, self-evaluation, and bibliographic information button 5050 are displayed as items on a list, on a per conference basis. The personal portal screen 5000 in FIG. 10 allows a user to view the list 5010 of conferences he/she participated in. Self-evaluation is an example of evaluation information.

The personal memo buttons 5030 are each linked to a personal memo screen 5300, which displays a personal memo dm used in a corresponding one of conferences. The shared memo buttons 5040 are each linked to a shared memo screen 5400, which displays a shared memo cm used in the corresponding conference. Bibliographic information buttons 5050 are each linked to a bibliographic information display screen 5200, which displays bibliographic information used in the corresponding conference.

The personal portal screen 5000 also includes a search field 5020 through which a character search request is received from a user. A user who operates the personal terminal 2 may input characters in the search field 5020 to search for a conference by searching for the input characters in a personal memo dm, a shared memo cm, or bibliographic information, and may display a corresponding conference, as illustrated in the personal portal screen 5100 in FIG. 11.

FIG. 11 is a diagram illustrating an example of a personal portal screen that displays a search result. The search result 5140 of the personal portal screen 5100 of FIG. 11 displays items similar to items in the list 5010 of conferences illustrated in FIG. 10. That is, the search result 5140 of FIG. 11 includes date and time, conference name, location, a personal memo button 5110, shared memo button 5120, self-evaluation, and bibliographic information button 5130 that are displayed as items on a per searched conference basis.

A user who operates the personal terminal 2 is thus able to switch to the bibliographic information display screen 5200, the personal memo screen 5300, and the shared memo screen 5400, not only from the personal portal screen 5000 before search, but also from the personal portal screen 5100 after search. The following illustrates examples in which the personal portal screen 5100 after search illustrated in FIG. 11 is switched to the bibliographic information display screen 5200, to the personal memo screen 5300, and to the shared memo screen 5400.

Figure 12:
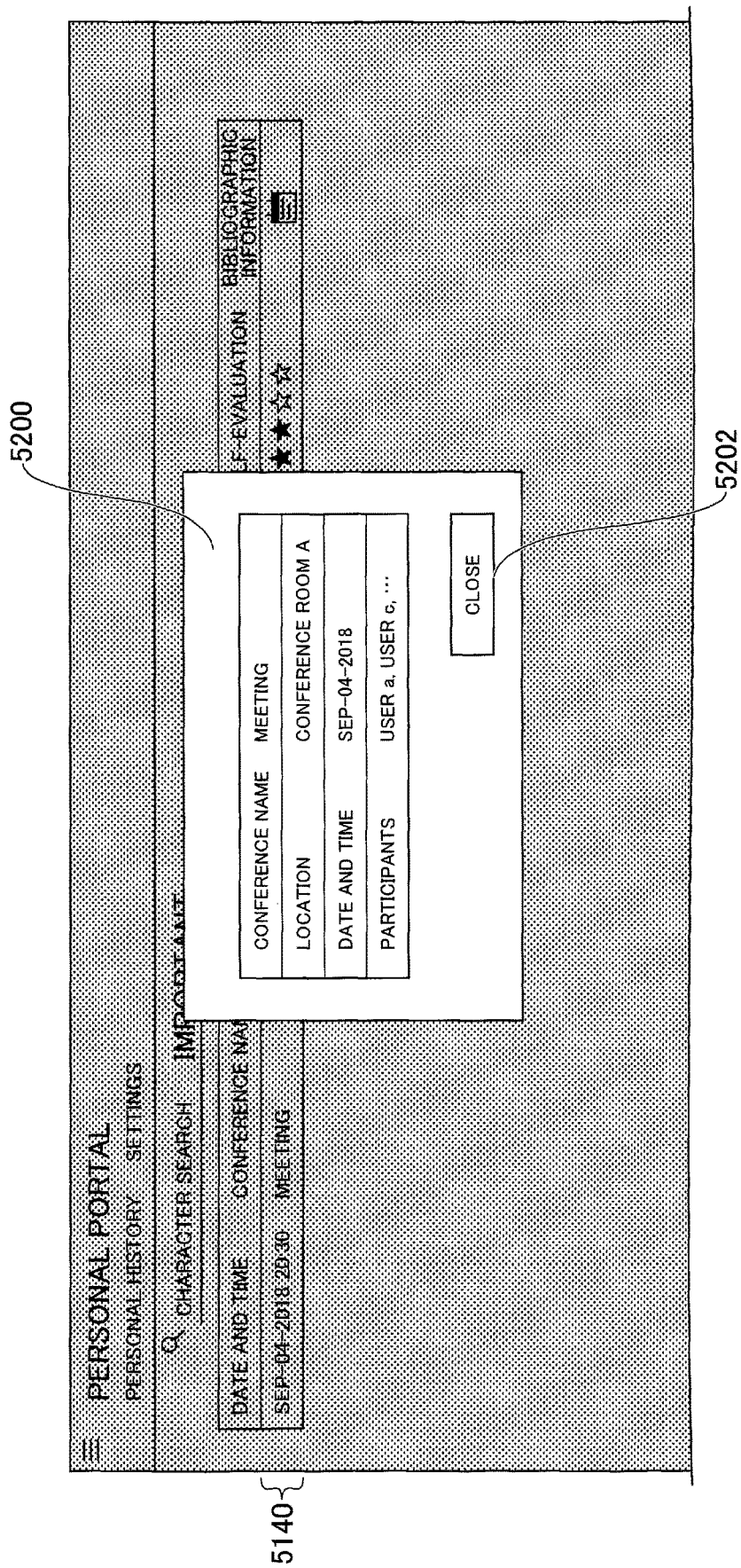
FIG. 12 is a diagram illustrating a display example of a bibliographic information screen, according to the present embodiment.

Upon clicking of the bibliographic information button 5130 of the personal portal screen 5100 of FIG. 11, the personal terminal 2 displays the bibliographic information display screen 5200, for example, as illustrated in FIG. 12. FIG. 12 is a diagram illustrating an example of the bibliographic information display screen. The bibliographic information displayed on the bibliographic information display screen 5200 is, for example, information in the shared memo management DB 6005 of FIG. 6C. According to the bibliographic information display screen 5200 of FIG. 12, a user may select a desired conference based on the bibliographic information.

Figure 13:
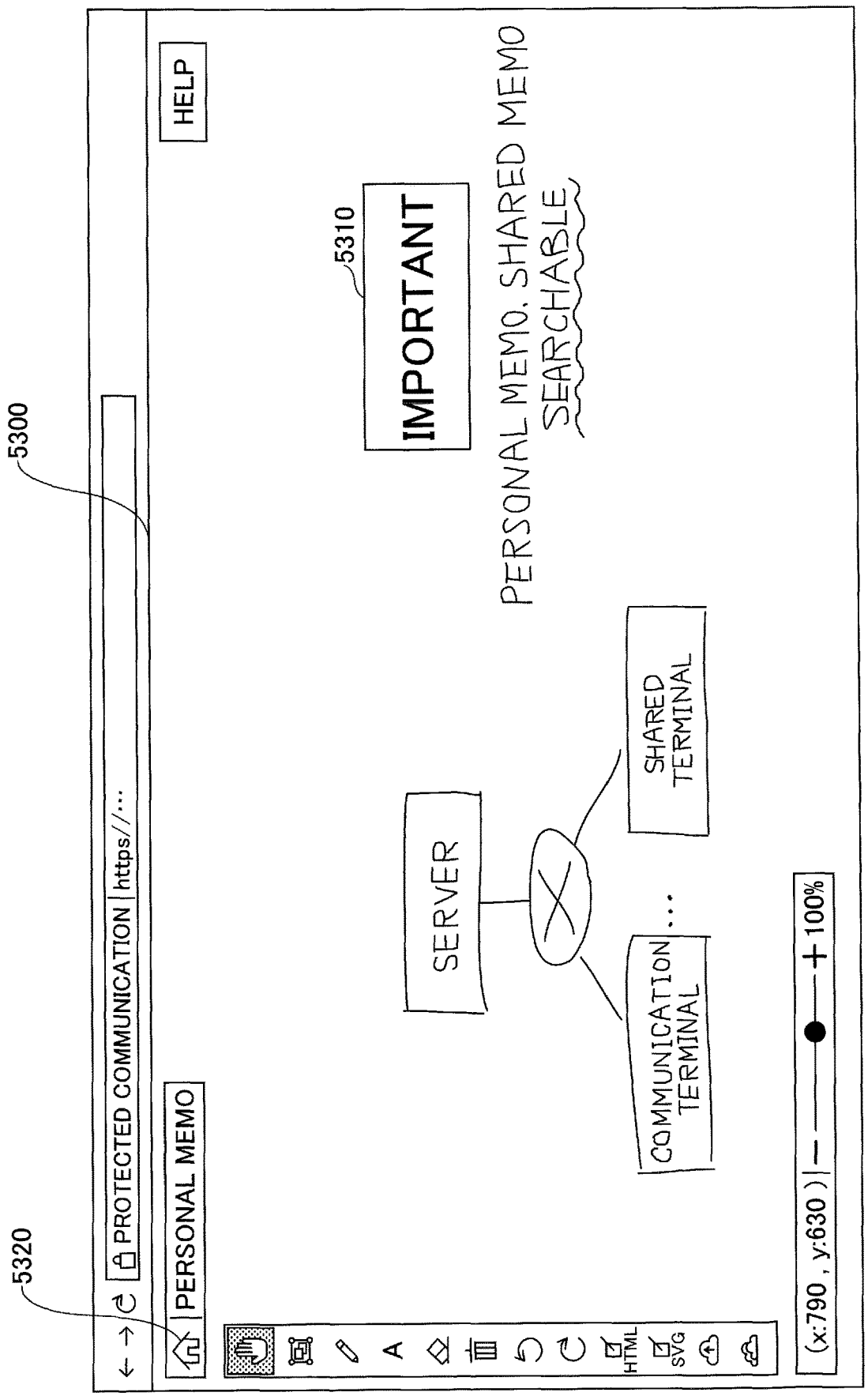
FIG. 13 is a diagram illustrating a display example of a personal memo screen, according to the present embodiment.

Upon clicking of the personal memo button 5110 on the personal portal screen 5100 in FIG. 11, the personal terminal 2 displays the personal memo screen 5300, for example, as illustrated in FIG. 13. FIG. 13 is a diagram illustrating an example of the personal memo screen. A personal memo displayed on the personal memo screen 5300 is, for example, data in the personal memo DB 6001 as illustrated in FIG. 5A.

The personal memo screen 5300 includes a home button 5320 displayed as illustrated in FIG. 13. Upon the home button 5320 being clicked, the personal memo screen 5300 returns to the personal portal screen 5100 illustrated in FIG. 11. According to the personal memo screen 5300 of FIG. 13, a user may display a personal memo dm at a desired conference.

Figure 14:
FIG. 14 is a diagram illustrating a display example of a shared memo screen, according to the present embodiment.

Upon clicking of the shared memo button 5120 of the personal portal screen 5100 in FIG. 11, the personal terminal 2 displays the shared memo screen 5400, for example, as illustrated in FIG. 14. FIG. 14 is a diagram illustrating an example of the shared memo screen. The shared memo displayed on the shared memo screen 5400 is, for example, data in the shared memo DB 6002 as illustrated in FIG. 5B.

The shared memo screen 5400 includes a home button 5420 displayed as illustrated in FIG. 14. Upon the home button 5420 being clicked, the shared memo screen 5400 returns to the personal portal screen 5100 illustrated in FIG. 11. According to the shared memo screen 5400 illustrated in FIG. 14, a user may display the shared memo cm at a desired conference.

<Processing or Operation>

Next, processing or operation according to the present embodiment will be described. According to the present embodiment, searching for the personal memo dm and shared memo cm, which are edited during a conference conducted in a virtual room, is performed by the personal portal screen 5000 in FIG. 10.

Figure 15:
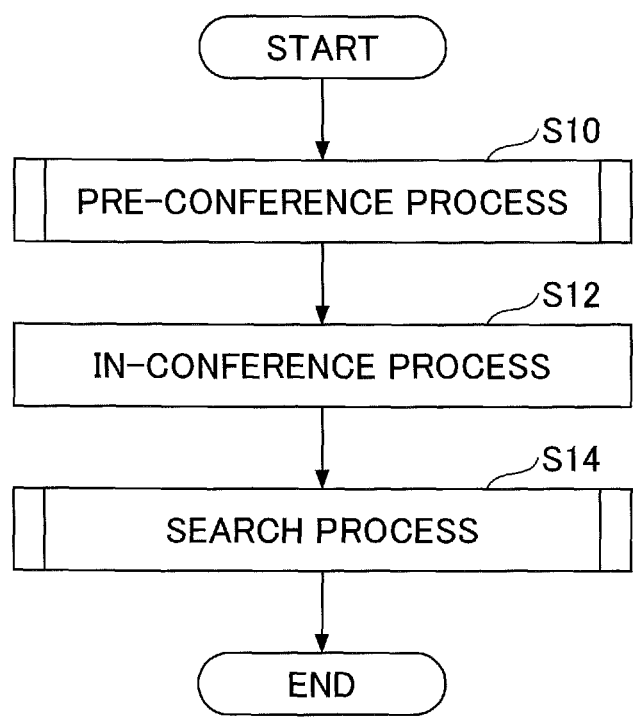
FIG. 15 is a flowchart illustrating an example of processing performed of the information sharing system, according to the present embodiment.

FIG. 15 is a flowchart illustrating an example of processing of the information sharing system according to the present embodiment. In step S10, pre-conference processing is performed in the information sharing system. Pre-conference processing involves generation of conference information, generation of a virtual room, and generation of a shared electronic screen, shared electronic canvas cc and personal electronic canvas dc in the virtual room.

Moving to step S12, the information sharing system performs processing during a conference, which is hereinafter referred to as "in-conference processing". Examples of the in-conference processing include editing of the shared electronic screen ss, shared electronic canvas cc, and personal electronic canvas dc. Note that the in-conference processing is performed by a user who has participated in a virtual room through the personal terminal 2. Moving to step S14, the information sharing system performs search processing, which includes receiving of a character search request with respect to a personal memo dm or a shared memo cm from a participant who has participated in a conference, and transmitting of a response as a search result.

(Step S10: Pre-Conference Processing)

Figure 16:
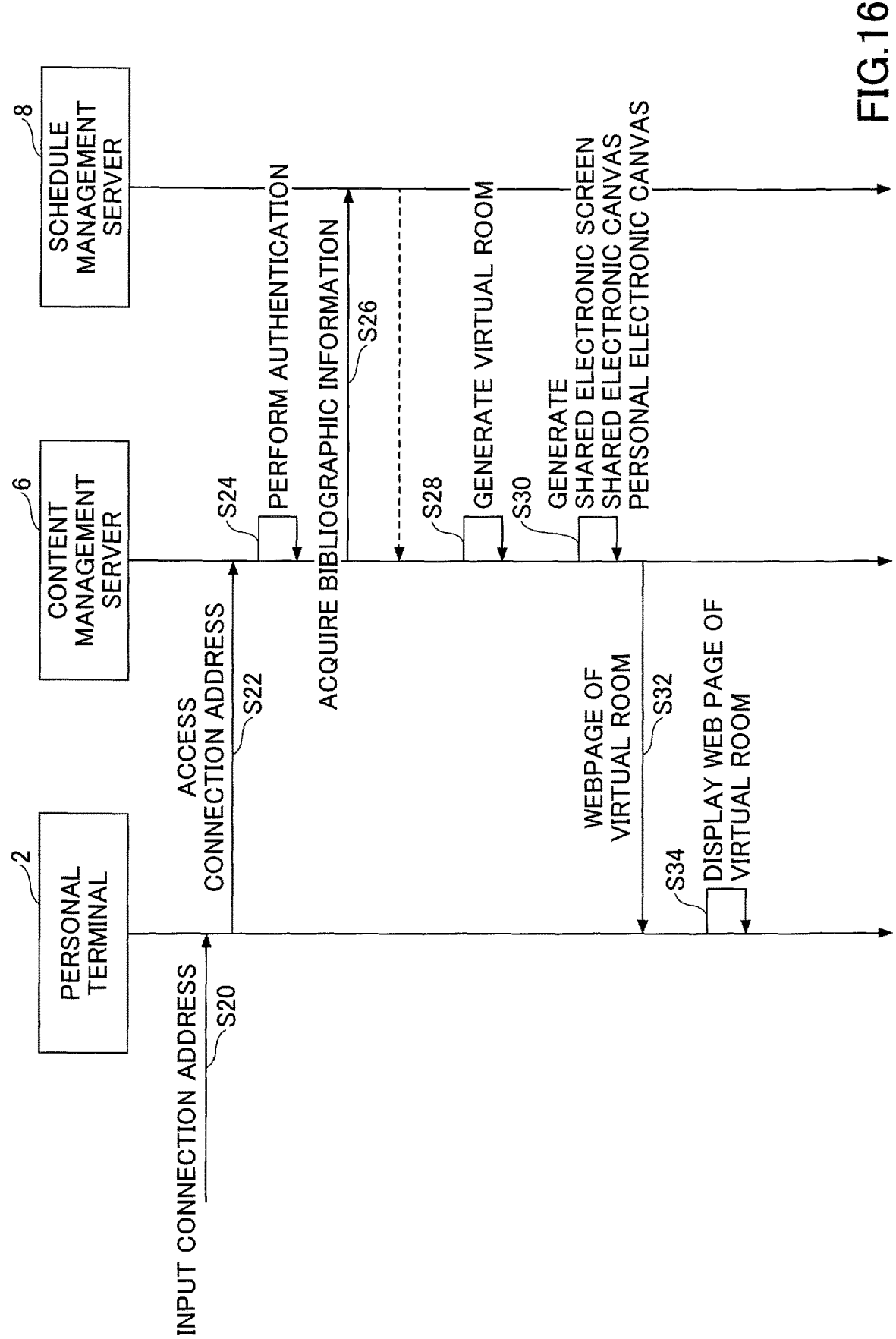
FIG. 16 is a sequence diagram illustrating an example of pre-conference processing, according to the present embodiment.

FIG. 16 is a sequence diagram illustrating an example of pre-conference processing. In step S20, a user who operates the personal terminal 2 inputs an address for connecting to a virtual room into a web browser. The address for connecting to a virtual room may also hereinafter be referred to as a "connection address-to-virtual room". The connection address-to-virtual room may be displayed on the shared terminal 4 in the conference room X of FIG. 1 so as to present the connection address-to-virtual room to participants of the conference. Alternatively, the connection address-to-virtual room may be stored as a bookmark of the web browser of the personal terminal 2. The shared terminal 4 may display an address bar 5500, as that illustrated in FIG. 17, to inform conference participants of the connection address.

Figure 17:
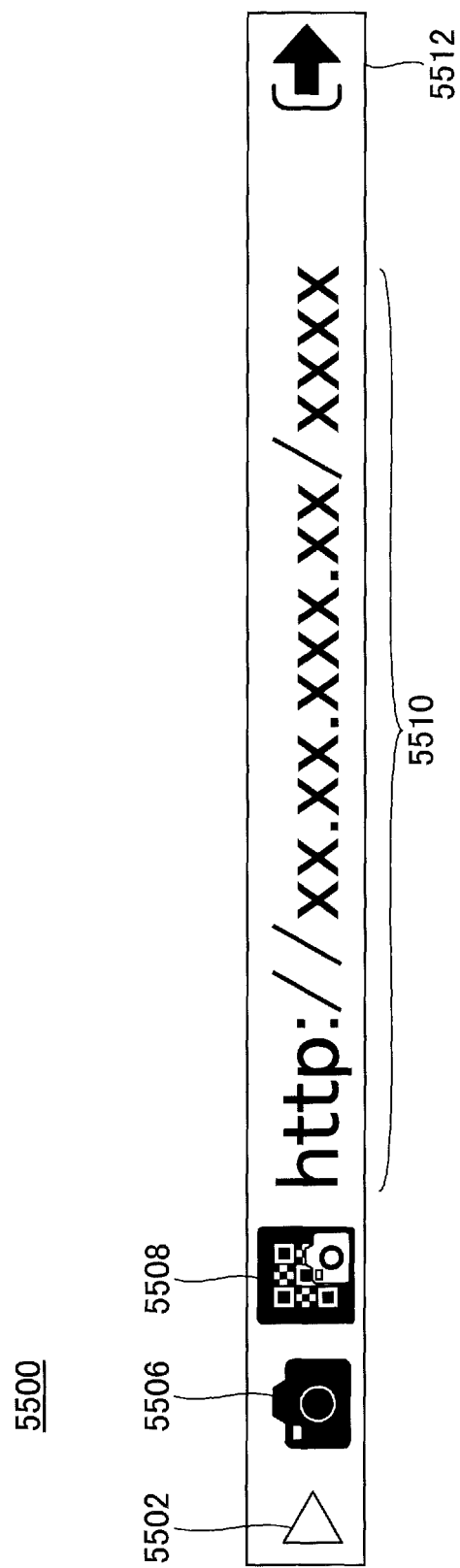
FIG. 17 is a diagram illustrating an example of an address bar displayed on a shared terminal, according to the present embodiment.

FIG. 17 is a diagram illustrating an example of an address bar displayed on a shared terminal. The address bar 5500 illustrated in FIG. 17 includes a button 5502, a capture button 5506, a two-dimensional code display button 5508, a connection address 5510 and an exit button 5512.

The button 5502 is configured to display or not to display buttons to the right of the button 5502 of address bar 5500. The capture button 5506 is configured to capture a shared electronic screen ss, and attach the captured shared electronic screen ss to a shared memo cm or personal memo dm. The two-dimensional code display button 5508 is configured to display a connection address 5510 in a two-dimensional code. A user is able to input the connection address 5510 into the web browser by imaging a two-dimensional code using the personal terminal 2. The connection address 5510 is an address for connecting to a virtual room. The exit button 5512 is configured to exit the virtual conference room in which the shared terminal 4 has participated.

The address bar 5500 is displayed by an application installed on the shared terminal 4 (including a case where an application is installed on a stick PC or the like connected to the shared terminal 4). A function similar to the address bar 5500 may be implemented by a web application. In addition, applications installed in the shared terminal 4 may be provided by using a cloud service.

Moving to step S22, the web browser of the personal terminal 2 accesses the input connection address 5510 to a virtual room. The content management server 6 performs authentication processing for a user who operates the personal terminal 2. The following illustrates a case where authentication has been successful. The content management server 6 proceeds to step S26 and acquires the user's schedule information from the schedule management server 8.

The user's schedule information acquired in step S26 may include, for example, bibliographic information of a conference in which a user has participated. Accordingly, the content management server 6 may obtain bibliographic information of a conference in which a user has participated.

In step S28, the content management server 6 generates a virtual room, for example, as illustrated in FIG. 1. In step S30 the content management server 6 generates a shared electronic screen ss, a shared electronic canvas cc, and a personal electronic canvas dc. In step S32, the content management server 6 generates webpage data of a virtual room as illustrated in FIGS. 7 to 9 and transmits the generated webpage data to the personal terminal 2.

In step S34, since a webpage of the virtual room is displayed through the web browser of the personal terminal 2 based on the received webpage data, a user is able to browse the shared electronic screen ss, edit the personal memo dm, and edit the shared memo cm.

FIG. 16 illustrates processing in which a first one of the terminals inputs the connection address 5510 to the virtual room into the web browser. In the processing of the second and subsequent terminals, processing that has already been completed by the first terminal will be omitted. Such omitted processing includes the generation of the virtual room in step S28, the generation of the shared electronic screen ss in step S30, and the generation of the shared electronic canvas cc. However, in the processing of the second and subsequent terminals, the generation of the personal electronic canvas dc in step S30 is not omitted because the personal electronic canvas dc is personally dedicated to each individual.

(Step S12: In-Conference Processing)

Figure 18:
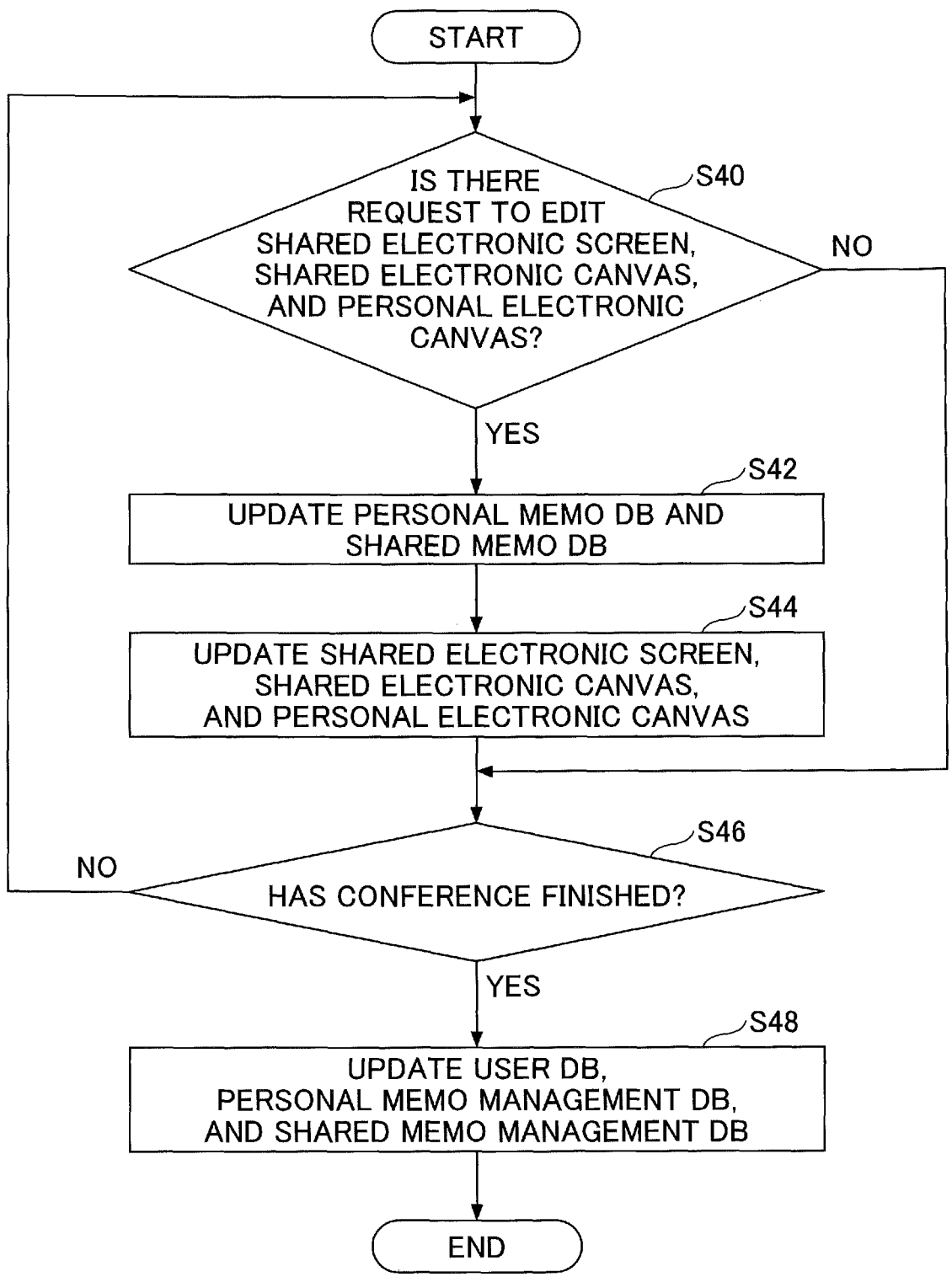
FIG. 18 is a flowchart illustrating an example of in-conference processing, according to the present embodiment.

FIG. 18 is a flowchart illustrating an example of in-conference processing. In step S40, the content management server 6 determines whether a request for editing one of the shared electronic screen ss, the shared electronic canvas cc, and the personal electronic canvas dc in a virtual room has been received from any of the users' personal terminals 2 that have participated in the virtual room.

Upon determining that such an editing request has been received, the content management server 6 performs processing of step S42 and step S44. In step S42, the content management server 6 updates the personal memo DB 6001 and the shared memo DB 6002 in response to the editing request. In step S44, the content management server 6 updates display of the shared electronic screen ss, the shared electronic canvas cc, and the personal electronic canvas dc in the virtual room in response to the editing request.

As a result of the processing in steps S42 and S44, the users' personal terminals 2 that have participated in the same virtual room each display the same content on the shared electronic screen ss and the shared electronic canvas cc, and also each display different content on the personal electronic canvas dc dedicated to the corresponding one of the users. The processing in steps S40 to S46 is repeated until the conference in the virtual room is completed.

Upon the virtual room conference being completed, the content management server 6 proceeds to step S48 and updates the user DB 6003 of FIG. 6A, the personal memo management DB 6004 of FIG. 6B, and the shared memo management DB 6005 of FIG. 6C. For example, the content management server 6 stores, in the user DB 6003 of FIG. 6A, the user IDs of users who have participated in a conference, in association with the personal memo IDs of the personal memos dm of the users, respectively. The content management server 6 also stores, in the personal memo management DB 6004 of FIG. 6B, the personal memo IDs of users who have participated in a conference, in association with the shared memo ID of the shared memo cm jointly edited by these users who have participated in the conference, and memo data including character information noted in the personal memos dm identified by the respective personal memo IDs. For example, the content management server 6 stores, as memo data, text data noted in the personal memo dm or text data extracted from the handwritten characters by the optical character recognition. In addition, the content management server 6 stores, in the shared memo management DB 6005 of FIG. 6C, the shared memo ID of the shared memo cm jointly edited by users who have participated in a conference in association with the bibliographic information of the conference.

FIG. 18 illustrates an example of the processing in step S48 performed upon a conference in the virtual room being completed. However, the processing in step S48 may be performed every time a user leaves the virtual room. As described above, performing of the processing in step S48 may enable a user who has left the virtual room to immediately review content of the conference while the conference in the virtual room is still ongoing.

(Step S14: Search Processing)

Figure 19:
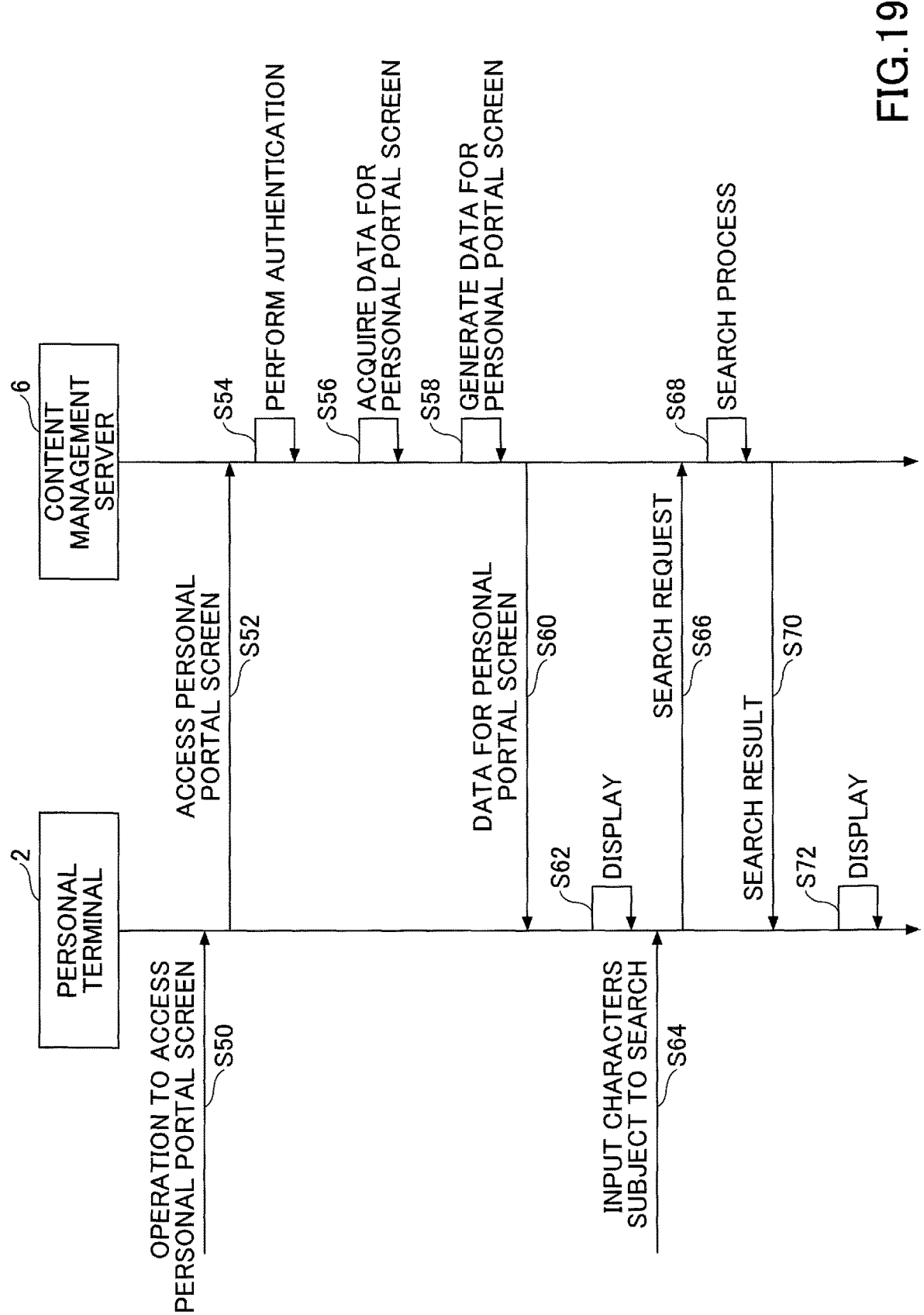
FIG. 19 is a sequence diagram illustrating an example of search processing, according to the present embodiment.

FIG. 19 is a sequence diagram illustrating an example of search processing. In step S50, a user who operates the personal terminal 2 performs an operation to access the personal portal screen 5000, for example, as illustrated in FIG. 10. The operation to access the personal portal screen 5000 may be to input an address into the web browser to connect to the personal portal screen 5000 or may be to select the personal portal screen 5000 using bookmarks.

Moving to step S52, the web browser of the personal terminal 2 accesses the personal portal screen 5000. In step S54, the content management server 6 performs authentication processing for a user who operates the personal terminal 2. The following illustrates a case where authentication has been successful. The content management server 6 proceeds to step S56 and reads data for the personal portal screen 5000 from the storage 6000.

Specifically, the content management server 6 identifies the user's personal memory ID from the user DB 6003 of the storage 6000 using the authenticated user ID as a key. The content management server 6 identifies the shared memo ID from the personal memo management DB 6004 of the storage 6000, using the identified personal memo ID as a key. The content management server 6 identifies the bibliographic information of a conference from the shared memo management DB 6005 of the storage 6000, using the identified shared memo ID as a key.

As described above, identification of a user ID of a user enables the content management server 6 to acquire, from the user DB 6003 of the storage 6000, the personal memo management DB 6004, and the shared memo management DB 6005, data for the personal portal screen 5000 necessary for generating a list of conferences in which a user participated.

Moving to step S58, the content management server 6 generates data for generating a webpage (hereinafter referred to as "webpage data") for the personal portal screen 5000 from the acquired data for the personal portal screen 5000. Moving to step S60, the content management server 6 transmits the webpage data for the personal portal screen 5000 to the personal terminal 2.

Moving to step S62, the personal terminal 2 is enabled to display the personal portal screen 5000 as illustrated in FIG. 10. The personal portal screen 5000 illustrated in FIG. 10 displays a list of conferences in which a user who operates the personal terminal 2 participated.

For example, there may be a case where a large number of conferences in which a user participated are included in the list 5010 of conferences, and the user wishes to extract, from the list 5010 of conferences, a particular type of conferences by text search. Or there may be a case where a desired conference cannot be identified from the information displayed in the list 5010 of conferences. In such cases, the user may use a search function of the personal portal screen 5000.

In step S64, a user who operates the personal terminal 2 inputs search characters in the search field 5020. Moving to step S66, the web browser of the personal terminal 2 specifies the search characters that have been input in the search field 5020, and transmits a search request to the content management server 6. Moving to step S68, the content management server 6 performs the search processing based on the specified search characters.

Figure 20:
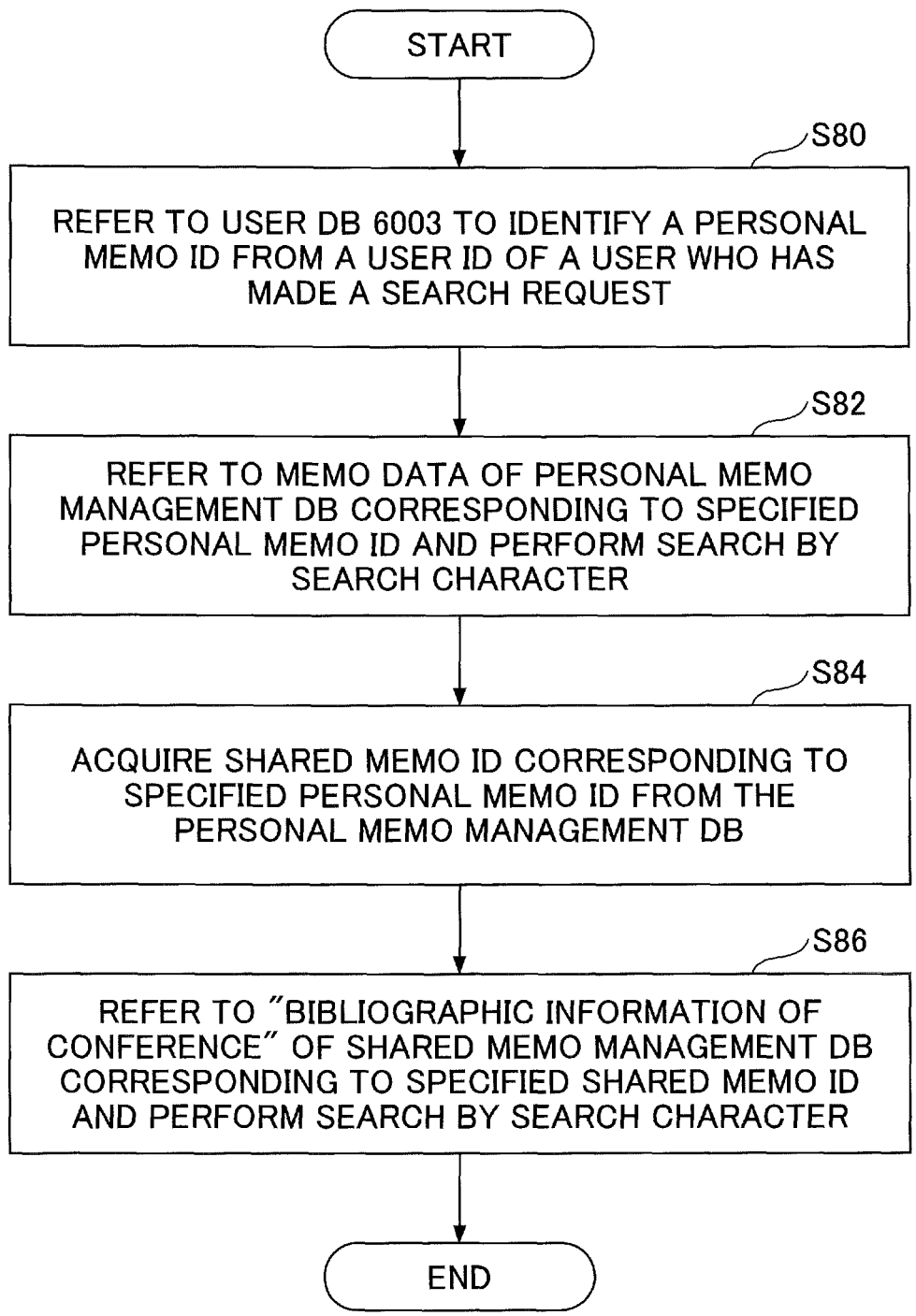
FIG. 20 is a flowchart illustrating an example of search processing in step S68, according to the present embodiment.

FIG. 20 is a flowchart illustrating an example of search processing of step S68. In step S80, the search unit 67 of the content management server 6 identifies, with reference to the user DB 6003 of FIG. 6A, a personal memo ID in accordance with a user ID of a user who has made a search request. The personal memo ID identified herein is a personal memo ID of the personal memo dm edited at the conference by the user who has made the search request.

In step S82, the search unit 67 performs a search using search characters, with reference to memo data of the personal memo management DB 6004 of FIG. 6B, which corresponds to the personal memo ID identified in step S80. The memo data of the personal memo management DB 6004 illustrated in FIG. 6B is text data included in the personal memo dm noted by a user on the personal electronic canvas dc or text data extracted from handwritten characters by optical character recognition. Thus, the user is enabled to search for a conference in association with a personal memo dm that contains the search characters.

The personal memo screen 5300 in FIG. 13 includes the text characters 5310 "important", so that the memo data of the personal memo ID corresponding to the personal memo screen 5300 has the content as illustrated in FIG. 6B, for example.

Moving to step S84, the search unit 67 acquires the shared memo ID corresponding to the personal memo ID identified in step S80, from the personal memo management DB 6004 illustrated in FIG. 6B. The shared memo ID acquired herein is a shared memo ID of the shared memo cm jointly edited by participants at the conference in which the user who made the search request participated.

In step S86, the search unit 67 refers to the "bibliographic information of a conference" in the shared memo management DB 6005 in FIG. 6C, which corresponds to the shared memo ID specified in step S84, and performs a search using the search characters. The "bibliographic information of a conference" in the shared memo management DB 6005 in FIG. 6C is bibliographic information of a conference in which a user has participated. Accordingly, the user may search for a conference in association with bibliographic information that contains the search characters, from among the conferences in which the user participated.

Referring back to step S70 of FIG. 19, the search unit 67 transmits, to the personal terminal 2, a search result obtained in step S68. That is, the search unit 67 transmits, to the personal terminal 2, a conference in association with the bibliographic information or personal memo dm that contains the search characters, as a search result, from among the conferences in which a user participated. Moving to step S72, the personal terminal 2 displays the personal portal screen 5100 including the search result 5140 as illustrated in FIG. 11.

In the information sharing system according to the present embodiment, as illustrated on the personal portal screen 5000 in FIG. 10, a user may easily switch to the bibliographic information display screen 5200, the personal memo screen 5300, and the shared memo screen 5400 of each one of the conferences, from the personal portal screen 5000 displaying the list 5010 of the conferences in which a user participated. Thus, it is easy for a user to review content of a desired one of the conferences.

Further, in the information sharing system according to the present embodiment, it is easy for a user to specify a desired conference, because the personal portal screen 5000 has a character search function to search for desired characters in each of the bibliographic information display screen 5200, the personal memo screen 5300, and the shared memo screen 5400. Further, in the information sharing system according to the present embodiment, as illustrated in FIG. 16, a conference may start upon a user's participating in a virtual room, which is generated by the user's accessing of the connection address-to-virtual room through the web browser of the personal terminal 2. Accordingly, the information sharing system according to the present embodiment facilitates management of unplanned conference or meeting, such as a huddle meeting.

Other Embodiments

While embodiments of the present invention have been described above, the present invention is not limited to such embodiments, and various modifications and substitutions may be made without departing from the spirit of the present invention.

For example, in the first embodiment, character information (text or handwritten characters) noted in the shared memo cm is not a search target; however, character information noted in the shared memo cm may be a search target. In this case, the shared memo management DB 6005 of FIG. 6C is configured as illustrated in FIG. 21.

FIG. 21 is a configuration diagram illustrating an example of a shared memo management DB. The storage 6000 of the content management server 6 includes a shared memo management DB 6005, as illustrated in FIG. 21. The shared memo management DB 6005 is configured to manage a set of memo data and bibliographic information of a conference in association with the shared memo ID for identifying a shared memo. The memo data is text data in a shared memo cm noted by a user on the shared electronic canvas cc or text data extracted from handwritten characters by optical character recognition.

Identification of a shared memo ID according to the shared memo management DB 6005 of FIG. 21 will identify bibliographic information of a conference in association with the shared memo ID and text data (memo data) indicating content of characters jointly written by users on the shared electronic canvas cc at the conference.

Further, in addition to the character information noted in the personal memo dm and the character information noted in the shared memo cm, all the bibliographic information of a conference, such as the conference name and the location, and evaluation information of a conference may be a search target to be identified. Such a configuration allows users to retrieve a desired conference from a variety of information about the conference, without having to remember where a character string was being searched for, or whether a character string was written by users themselves. Accordingly, the present embodiment may improve convenience of users.

Further, the connection address 5510 illustrated in the first embodiment may be an address that accesses a virtual room directly or may be an address that accesses a virtual room through a redirect. In the first embodiment, bibliographic information of a conference is acquired from the schedule management server 8. However, the present invention is not limited thereto, and bibliographic information of a conference may be acquired from a conference reservation system or the like. Alternatively, bibliographic information of a conference may be hand-written by conference participants during a conference and the like.

Further, the connection address 5510 illustrated in the first embodiment is an example of information for accessing a virtual room; however, the connection address 5510 may be a code, such as a passcode that can identify an accessible virtual room.

Figure 22:
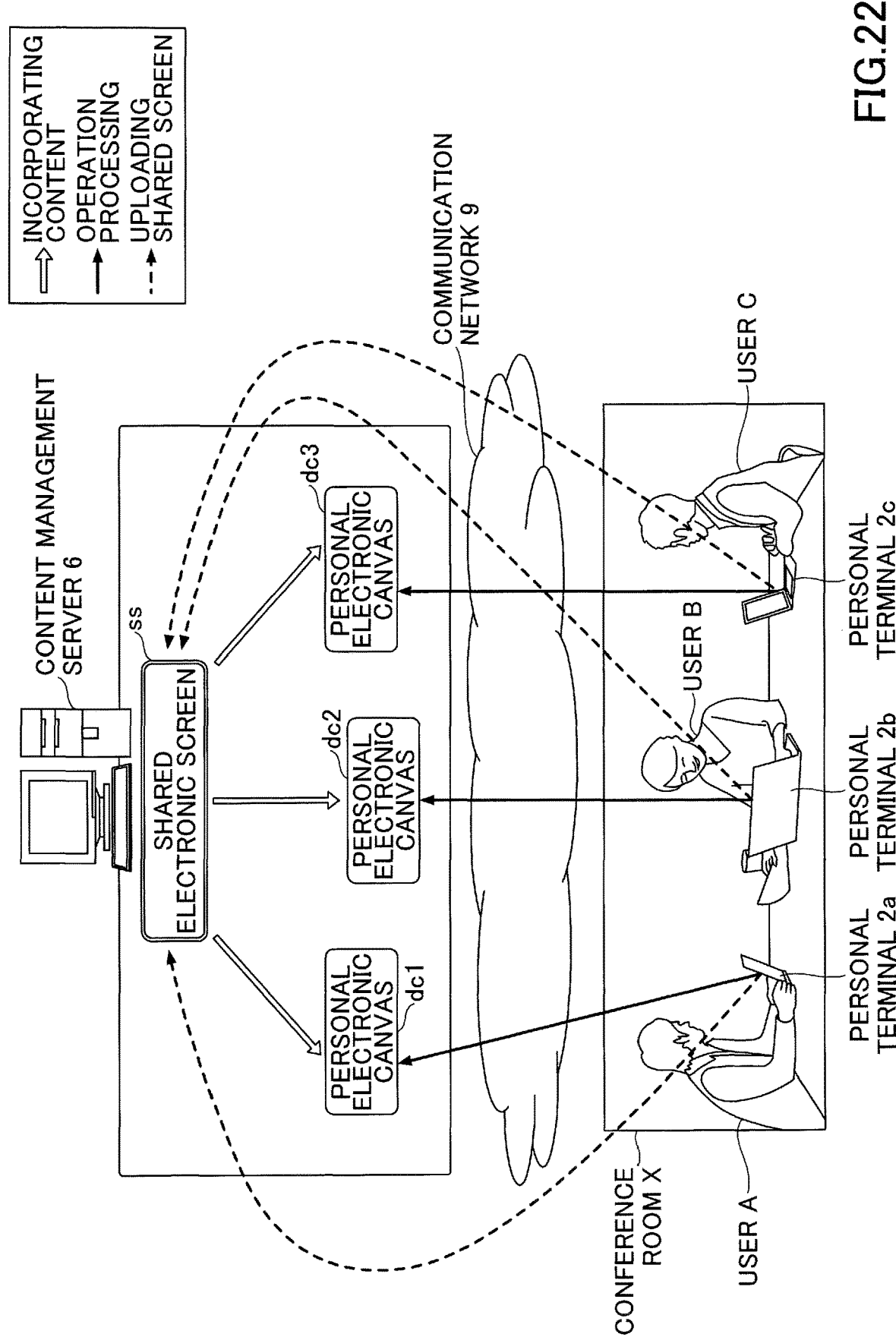
FIG. 22 is a diagram schematically illustrating an in-conference information sharing system as a whole, according to the present embodiment.

The information sharing system illustrated in FIG. 1 is an example and may be configured as illustrated in FIG. 22, for example. FIG. 22 is a diagram schematically illustrating an in-conference information sharing system as a whole, in accordance with the present embodiment. FIG. 22 illustrates an information sharing system in which users A, B, and C in the company's conference room X are holding a conference using the information sharing system. In the conference room X, the user A brings in a personal terminal 2a, and the user B brings in a personal terminal 2b.

As illustrated above, in the information sharing system according to the present embodiment, the users A, B, and C may be in different rooms physically separated from each other as illustrated in FIG. 1, or the users A, B, and C may be in the same room, such as a conference room, as illustrated in FIG. 22.

The information sharing system according to this embodiment may have a configuration in which there is no shared electronic canvas cc, as illustrated in FIG. 22. In this case, tab t2 of the "shared electronic canvas" in FIGS. 7 to 9 is not displayed, and the operation display area 120 for the shared electronic canvas display in FIG. 8 is not displayed. Further, the information sharing system according to this embodiment may have a configuration without a shared terminal 4, as illustrated in FIG. 22.

As illustrated in FIG. 22, in a case where the information sharing system according to this embodiment has no shared electronic canvas cc, the shared memo buttons 5040 in the personal portal screen 5000 illustrated in FIG. 10 are not displayed. Similarly, the shared memo button 5120 in the personal portal screen 5100 illustrated in FIG. 11 is not displayed.

The functions of the embodiments described above may be implemented by one or more processing circuits. As used herein, a "processing circuit" includes a processor programmed to perform each function by software, such as a processor implemented in electronic circuits, or a device that includes an ASIC (Application Specific Integrated Circuit), a digital signal processor (DSP), a field programmable gate array (FPGA), or a conventional circuit module designed to perform each of the functions as described above.

The shared memo cm is an example of a shared content as claimed in the claims. The personal memo dm is an example of personal content. The shared memo cm and personal memo dm are examples of editable conference content. The storing/reading processor 69 is an example of a storage controller.

Advantageous Effects of Invention

According to an embodiment of the present invention, it is possible to manage conference content, which is editable via a web browser of a communications terminal.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The present invention is not limited to the specifically disclosed embodiments, and variations and modifications may be made without departing from the scope of the present invention.

What is claimed is:

1. An information processing apparatus for displaying editable conference content, the information processing apparatus comprising:
    a memory; and
    one or more processors coupled to the memory and configured to:
        store, in a storage, conference information indicating a specific conference in association with editable conference content, wherein the editable conference content includes shared content and personal content, the shared content being jointly editable by a plurality of users via respective web browsers of a plurality of communication terminals, and the personal content being individually editable only by corresponding users via the web browsers;
        generate webpage data based on the shared content, the personal content and the conference information, the webpage data for displaying the conference information and the editable conference content on a webpage via a web browser of a communication terminal of the plurality of communication terminals; and
        display the conference information, the shared content and the personal content on the webpage, via the web browser of the communication terminal, upon a user of the communication terminal logging into the webpage, wherein
    the shared content and the personal content are simultaneously displayed on the webpage on a per conference information basis, and
    the shared content, the personal content, and the conference information are stored, in the storage, in association with the user identification information of the user of the communication terminal.

2. The information processing apparatus according to claim 1, wherein the personal content includes a screen captured image shared by communication terminals that are in association with the specific conference.

3. The information processing apparatus according to claim 1, wherein the shared content and the personal content are displayed on the webpage in a list on the per conference information basis.

4. The information processing system according to claim 1, wherein the one or more processors are further configured to:

search the shared content and the personal content in the storage upon receiving, from the user, a search request with respect to at least one of the shared content and the personal content; and generate webpage data for displaying a search result on the webpage in response to the search request.

5. The information processing apparatus according to claim 4, wherein the one or more processors are further configured to identify characters that are a search target, the characters being added to the shared content and the personal content by editing.

6. The information processing apparatus according to claim 5, wherein the one or more processors are further configured to identify first text data or second text data as the search target, the first text data being input into the shared content and the personal content by editing, and the second text data being extracted from the shared content and the personal content by optical character recognition.

7. The information processing apparatus according to claim 4, wherein the one or more processors are further configured to identify the conference information as a search target.

8. The information processing apparatus according to claim 7, wherein the one or more processors are further configured to identify the conference information as the search target, the conference information being acquired from a schedule management server.

9. The information processing apparatus according to claim 8, wherein the one or more processors are further configured to identify evaluation information of a conference as the search target, the evaluation information of a conference being included in the conference information.

10. An information processing system, comprising:
a plurality of communication terminals; and
an information processing apparatus for displaying editable conference content, the information processing apparatus including a memory and one or more processors coupled to the memory and configured to:
store, in a storage, conference information indicating a specific conference in association with the editable conference content, wherein the editable conference content includes shared content and personal content, the shared content being jointly editable by a plurality of users via respective web browsers of the plurality of communication terminals, and the personal content being individually editable only by corresponding users via the web browsers, and
generate webpage data based on the shared content, the personal content and the conference information, the webpage data for displaying the conference information and the editable conference content on the webpage via a web browser of a communication terminal of the plurality of communication terminals, wherein the shared content and the personal content are simultaneously displayed on the webpage on a per conference information basis, each communication terminal of the plurality of communication terminals includes a memory and one or more processors coupled to the memory and configured to display the conference information, the shared content and the personal content on the webpage, via the web browser the communication terminal upon a user of the communication terminal logging into the webpage, and the shared content, the personal content, and the conference information are stored, in the storage, in association with the user identification information of the user of the communication terminal.

11. An information processing method for displaying editable conference content, the information processing method comprising:
storing, in a storage, conference information indicating a specific conference in association with the editable conference content, wherein the editable conference content includes shared content and personal content, the shared content being jointly editable by a plurality of users via respective web browsers of a plurality of communication terminals, and the personal content being individually editable only by corresponding users via the web browsers;
generating webpage data based on the shared content, the personal content and the conference information, the webpage data for displaying the conference information and the editable conference content on a webpage via a web browser of a communication terminal of the plurality of communication terminals; and
displaying the conference information, the shared content and the personal content on the webpage, via the web browser of the communication terminal, upon a user of the communication terminal logging into the webpage, wherein
the shared content and the personal content are simultaneously displayed on the webpage on a per conference information basis, and
the storing includes storing, in the storage, the shared content, the personal content, and the conference information in association with the user identification information of the user of the communication terminal.

* * * * *